Oct. 30, 1956  L. DEL RICCIO ET AL  2,769,024
TELEVISION CONTROL SYSTEM
Filed Oct. 9, 1950  9 Sheets-Sheet 2

INVENTORS.
LORENZO DEL RICCIO, ROY M. SKEIRIK,
ROBERT E. GOTTFRIED, & ALLEN D. HOFFMANN
BY
Ernest J. Lilly
ATTORNEY.

Oct. 30, 1956  L. DEL RICCIO ET AL  2,769,024
TELEVISION CONTROL SYSTEM
Filed Oct. 9, 1950  9 Sheets-Sheet 3

INVENTORS
LORENZO DEL RICCIO, ROY M. SKEIRIK
ROBERT E. GOTTFRIED & ALLEN O. HOFFMANN
BY
ATTORNEY

Oct. 30, 1956    L. DEL RICCIO ET AL    2,769,024
TELEVISION CONTROL SYSTEM
Filed Oct. 9, 1950    9 Sheets-Sheet 5

INVENTORS
LORENZO DEL RICCIO, RAY M. SKEIRIK,
ROBERT E. GOTTFRIED, ALLEN D. HOFFMANN
BY
ATTORNEY

Oct. 30, 1956
L. DEL RICCIO ET AL
2,769,024
TELEVISION CONTROL SYSTEM
Filed Oct. 9, 1950
9 Sheets-Sheet 6
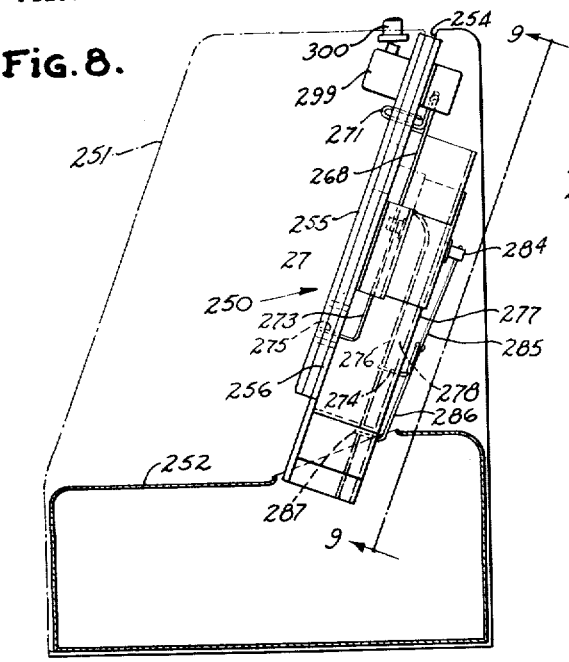
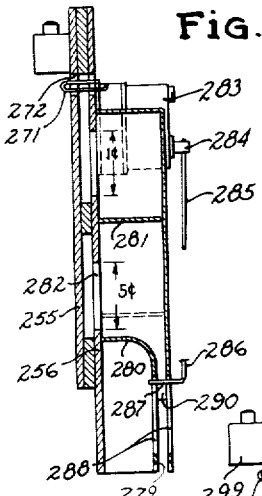
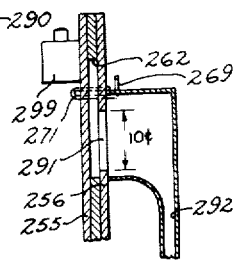
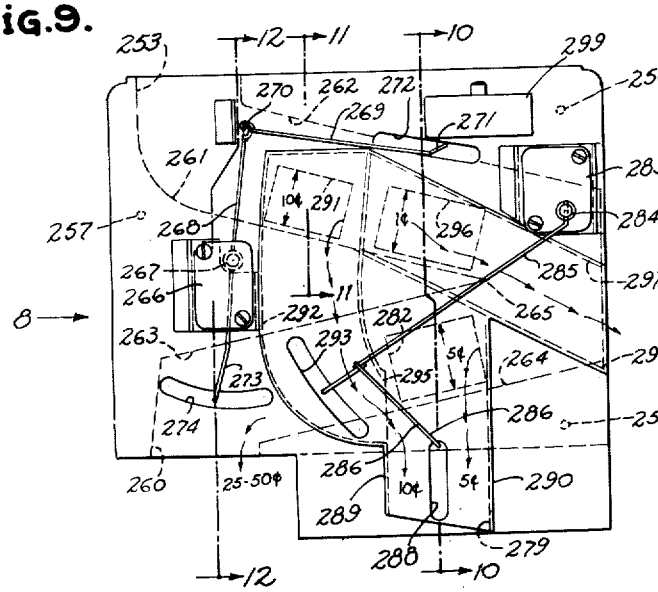
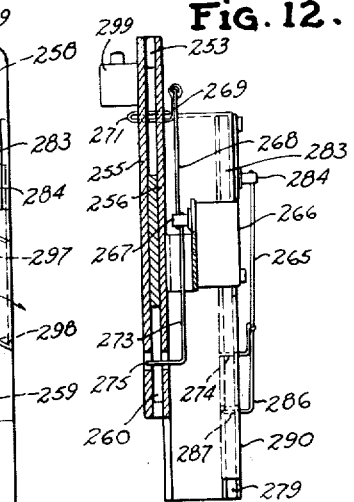
INVENTORS.
LORENZO DEL RICCIO, ROY M. SKEIRIK,
ROBERT E. GOTTFRIED, ALLEN D. HOFFMANN
BY
ATTORNEY.

Oct. 30, 1956  L. DEL RICCIO ET AL  2,769,024

TELEVISION CONTROL SYSTEM

Filed Oct. 9, 1950  9 Sheets-Sheet 7

INVENTOR.
LORENZO DEL RICCIO, ROY M. SKEIRIK.
ROBERT E. GOTTFRIED & ALLEN D. HOFFMANN
BY
*Ernest J. Lilley*
ATTORNEY.

Oct. 30, 1956     L. DEL RICCIO ET AL     2,769,024
TELEVISION CONTROL SYSTEM

INVENTORS.
LORENZO DEL RICCIO, ROY M. SKEIRIK,
ROBERT E. GOTTFRIED, ALLEN O. HOFFMANN
BY
ATTORNEY

INVENTORS.
LORENZO DEL RICCIO, ROY M. SKEIRIK,
ROBERT E. GOTTFRIED & ALLEN D. HOFFMANN
BY

ATTORNEY.

United States Patent Office 2,769,024
Patented Oct. 30, 1956

2,769,024

TELEVISION CONTROL SYSTEM

Lorenzo Del Riccio, Los Angeles, Roy M. Skeirik, Costa Mesa, and Robert E. Gottfried and Allen D. Hoffmann, Los Angeles, Calif., assignors, by mesne assignments, to International Telemeter Corporation, a corporation of Delaware Application October 9, 1950, Serial No. 189,262

16 Claims. (Cl. 178—5.1)

This invention relates to prepaid entertainment distribution systems and has particular reference to a system for distributing aural and visual entertainment to a plurality of remotely situated receiving and reproducing stations, the pre-payment being effected by coin collecting control apparatus at each such station. The system finds particular utility when employed for the distribution of radio and television programs.

In a copending application Serial No. 139,358, filed January 19, 1950 by David L. Loew, Carl Leserman, Lorenzo Del Riccio, and Robert E. Gottfried, and assigned to the assignee of this application, it is pointed out that in the radio broadcasting industry it has been possible to operate program distribution systems on a profitable basis through the use of the system as an advertising medium, but that in the distribution of television programs, the experience has been otherwise and advertising revenues have not been sufficient to permit the profitable distribution of high quality programs. It is pointed out that although some thought has been given to the use of coin collecting receivers prior to the invention disclosed in said copending application as a means for obtaining payment from the public for the entertainment received by them, the coin collecting systems devised prior to that invention were not satisfactory.

Specifically the prior coin collecting systems required the deposit of a fixed amount of money which was in no way related to the quality or duration of the program received, and also provided only for a definite time of operation on the receiver, and so failed to take into account the differing duration of the various programs, and the varying quality thereof and accordingly did not take into account the varying value to the public of the various programs distributed. Accordingly, ordinary coin collecting mechanisms provided no equitable way in which the monies received could properly be divided among the various broadcasting stations nor among the various suppliers of entertainment broadcast by those stations.

Recognizing these deficiencies of the prior mechanisms and systems the aforementioned copending application describes and claims an invention which includes coin collecting control apparatus adapted to be connected to any conventional television receiver wherever located, and which permits such a receiver to be used in the normal way to receive any programs which are distributed for free consumption by the viewing and listening public. Accordingly to said invention, certain programs are distributed as secret transmissions so as to be unintelligible when received on ordinary television receivers. By the deposit of a specified sum of money in the coin collecting apparatus, the otherwise secret transmissions are cleared to render the program intelligible. The coin collecting apparatus includes a price controlling mechanism so that different programs may be priced differently, the programs of higher quality and longer duration requiring the deposit of a greater amount of money than do the shorter programs of lower quality. Also, the apparatus disclosed in said prior application includes a recording device for producing a permanent record of all of the data necessary to effect the proper distribution of deposited monies among the various organizations disseminating the various secret programs.

The present invention is directed to a like system and is directed specifically to an improved system providing certain advantageous features of construction and operation not incorporated in the system disclosed in the aforementioned copending application. In particular, the recording apparatus disclosed in the prior application employed a perforating mechanism for perforating a paper tape or like recording medium according to a predetermined code, and included as one of the parameters so recorded, the identification of the particular channel or station being received, this latter parameter being introduced into the recording mechanism by a manual operation which was required to be performed by the user of the apparatus.

Such a recording mechanism, and in particular the requirement of a manual operation on the part of the user of the system, has obvious disadvantages, and the present invention includes the provision of a new and different recording system providing for a permanent and imperforate record of the various parameters and provides means for automatically recording those parameters without requiring any operation on the part of the user of the system other than the turning of the television receiver and the deposit of the appropriate amount of money.

It is accordingly an object of this invention to provide an entertainment distribution system of the prepaid type which overcomes the disadvantages hereinbefore mentioned.

It is also an object of this invention to provide an entertainment distribution system of the prepaid type including coin collection means at each receiver for rendering intelligible otherwise unintelligible transmissions together with a recording mechanism for recording all of the data essential to a distribution of the monies collected, wherein all of said data is transmitted from the transmitting station to the receiving station, and wherein said recording mechanism is actuated from said transmitting station.

It is a further object of this invention to provide an entertainment distribution system of the character set fourth in the preceding paragraph which includes a novel coin device comprising a coin sorter and integrator for determining the monetary value of the plurality of coins deposited in said coin device.

It is another object of this invention to provide an apparatus of the character set forth in the preceding paragraph wherein said coin device includes means defining separate paths for a plurality of coins of different denominations and wherein means is provided in each path responsive to the passage of a coin for producing electrical impulses, the number of which is representative of the value of the coin.

It is a still further object of this invention to provide a system and apparatus of the character set forth in the preceding paragraph in which said coin device is operated by the deposit of five cent and twenty-five cent coins to produce one of said impulses, and is operated by the deposit of ten cent and fixty cent coins to produce two of said impulses.

It is also an object of this invention to provide in an apparatus of the character set forth in the preceding paragraph a coin device which includes a coin integrator comprising a member movable a predetermined distance by each of the aforesaid impulses, said member being movable five times as far by the twenty-five cent and fifty cent impulses as by the five cent and ten cent impulses.

It is also an object of this invention to provide in a system of the character set forth hereinbefore a coin device of the character described in the preceding paragraph which includes also a second member movable in response to signals from said transmitting station to a position representative of the price of the program transmitted, together with means responsive to coincidence in location of said two members for rendering intelligible the otherwise unintelligible transmissions.

It is a still further object of this invention to provide apparatus of the character set forth hereinbefore in which said data for determining the distribution of collected coins is transmitted to the receiving station in the form of pulses representing said data by their number and arrangement in time according to a predetermined code.

It is another object of this invention to provide a system of the character set forth in the preceding paragraph in which said recording mechanism comprises a movable magnetic recording medium together with means for permanently magnetizing an elemental area of said medium, said recording mechanism including means for moving said medium in step-by-step fashion during the time periods separating said pulses.

Other objects and advantages of this invention will be apparent from a consideration of the following specification read in connection with the accompanying drawings, wherein.

Figure 3A:
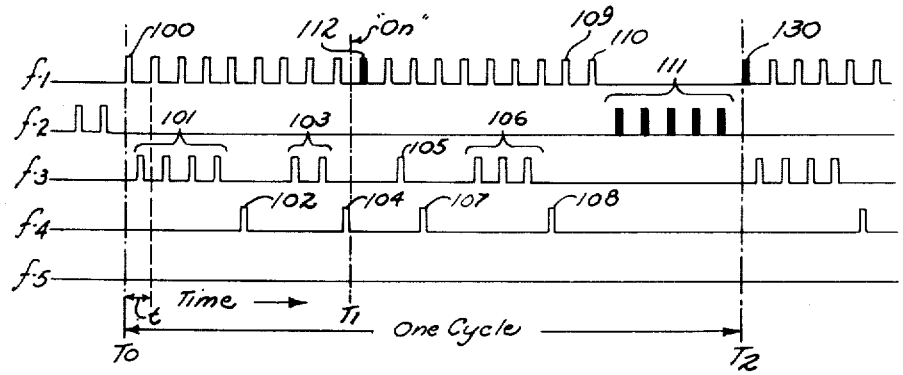
Figure 3B:
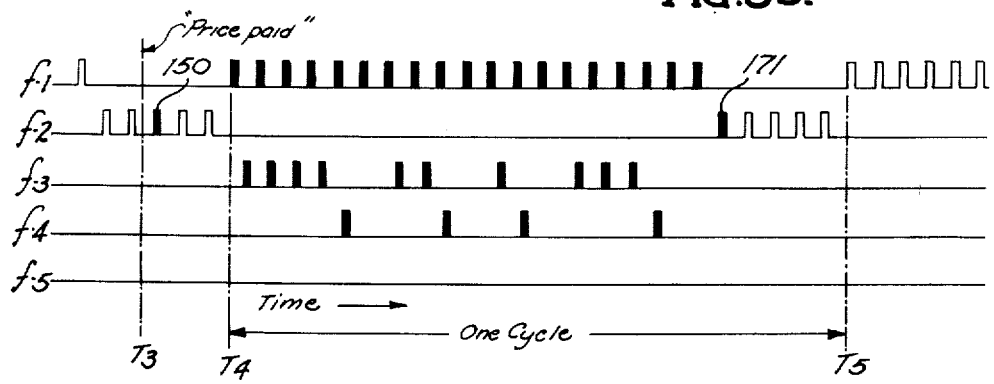
Figure 3C:
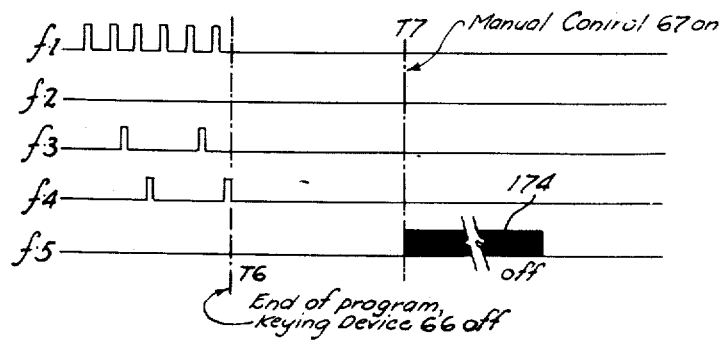
Figure 4:
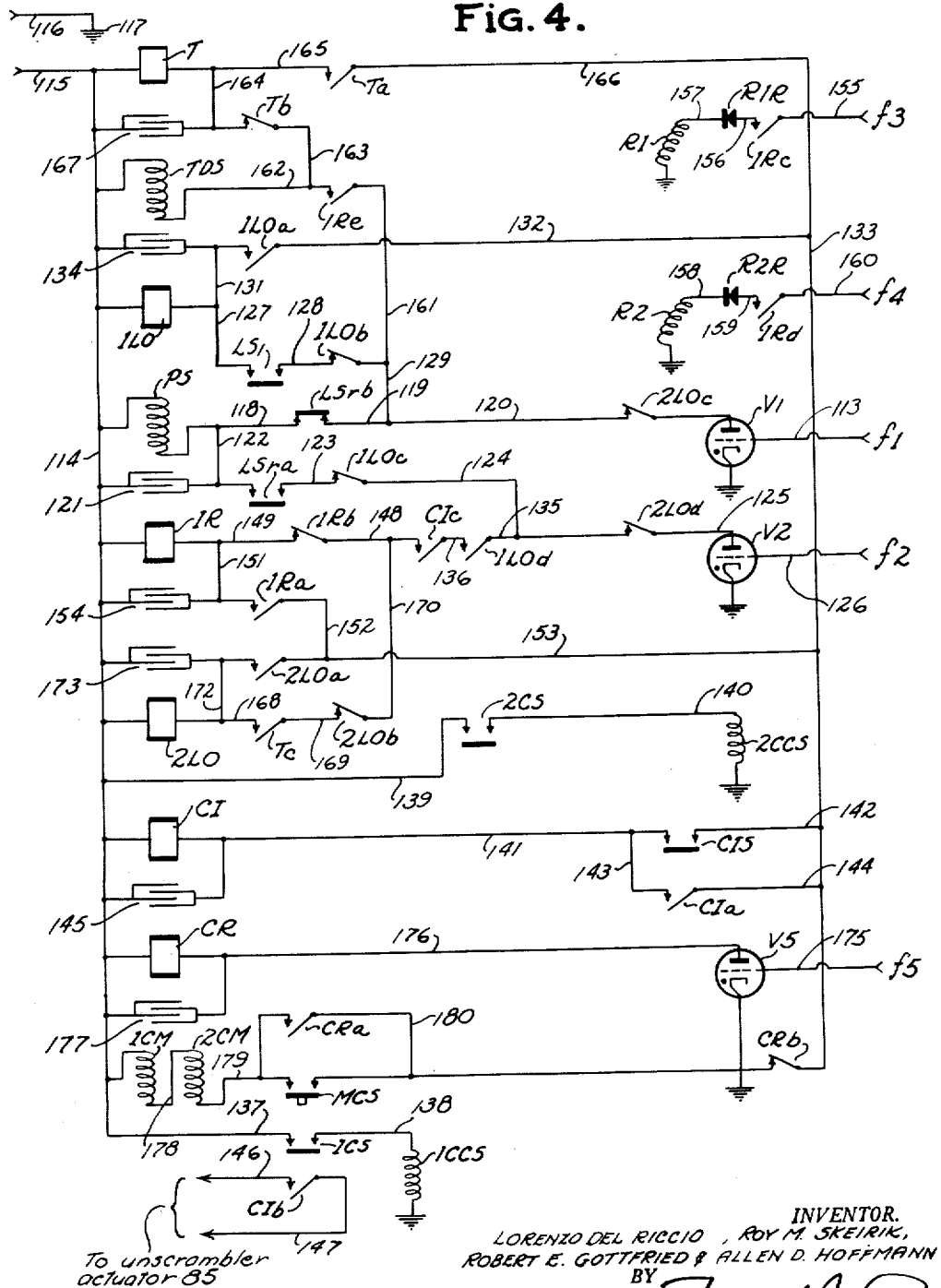
Figure 6:
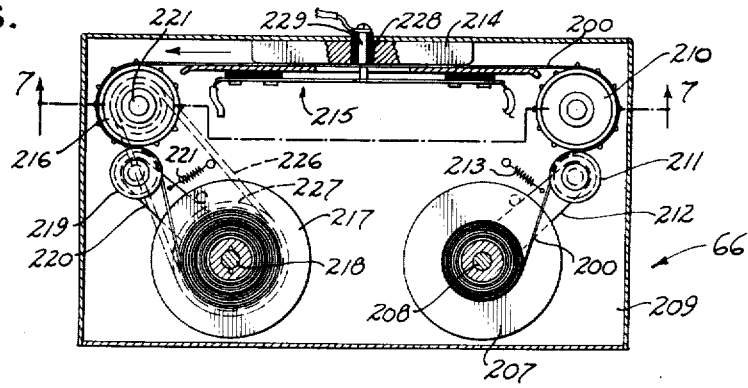
Figure 7:
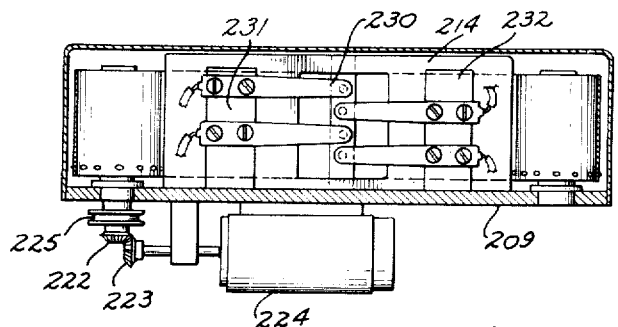
Figure 5:
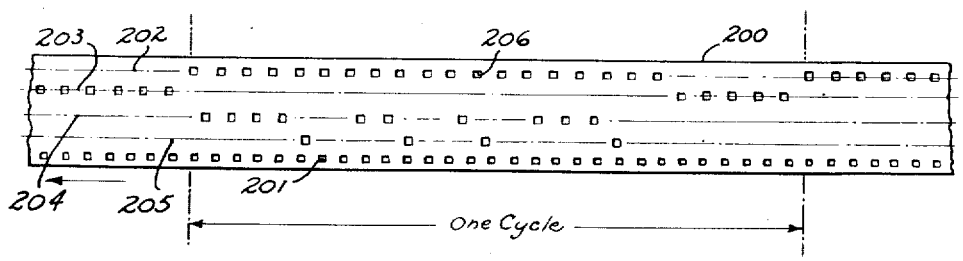
Figure 13:
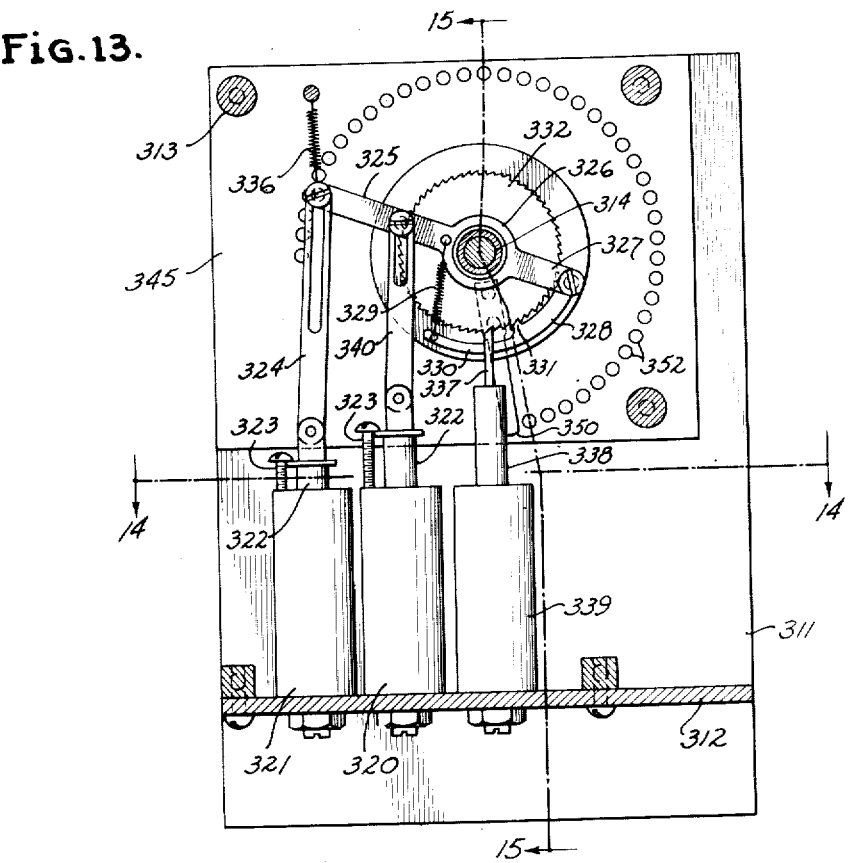
Figure 14:
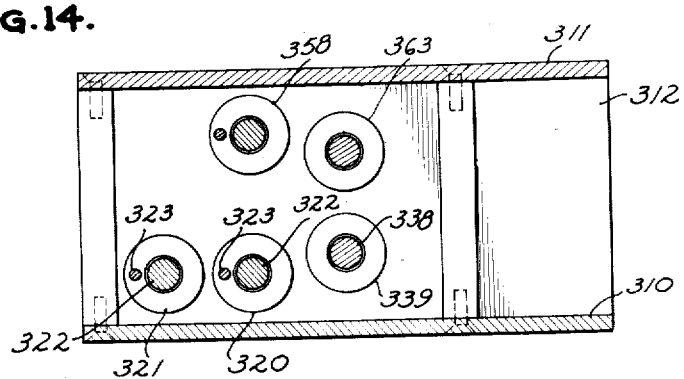
Figure 15:
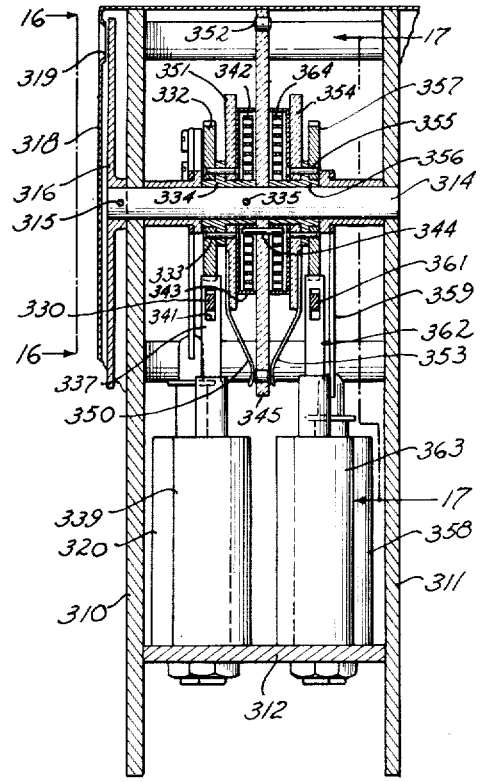
Figure 16:
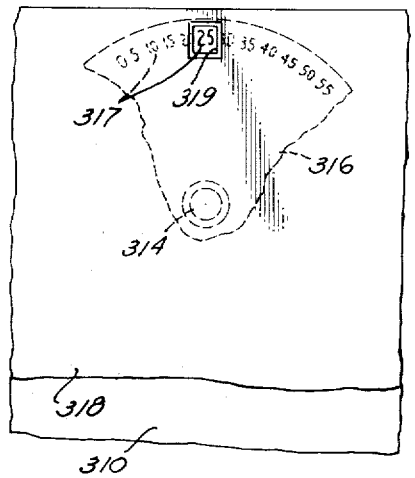
Figure 17:
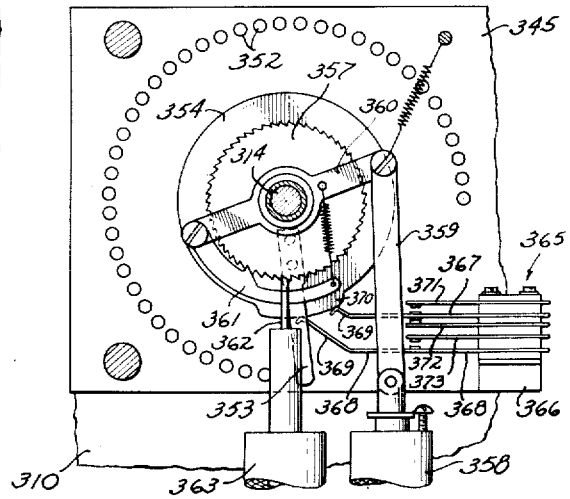
Figure 18:
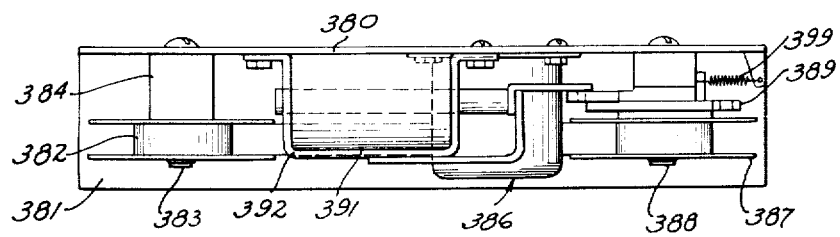
Figure 19:
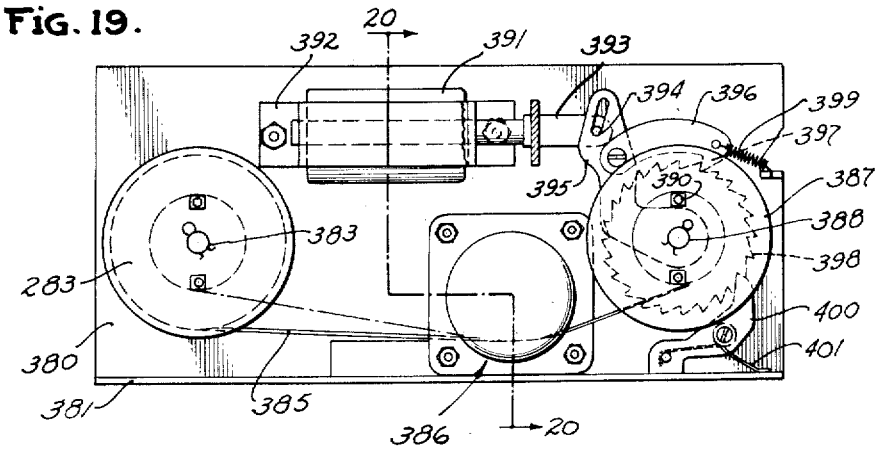

Figure 3 comprises three graphs (Figures 3a, 3b and 3c) showing the character and timed arrangement of various control pulses which are transmitted from the transmitting station to all receiving stations;

Figure 4 is a wiring diagram illustrating the instrumentalities and electrical connections employed in a pulse distributor and control mechanism used at the receiving station to control the operation of the receiving apparatus;

Figure 5 is a fragmentary plan view illustrating a section of control tape used in an automatic keying device at the transmitting station;

Figure 6 is a side elevational view of the keying mechanism with parts broken away and other parts shown in section;

Figure 7 is a horizontal sectional view taken substantially along the line 7—7 of Figure 6;

Figure 8 is a side view of a coin collecting sorting and counting mechanism used at each receiving station;

Figure 9 is a rear elevational view of the coin sorting mechanism taken as indicated by the line 9—9 of Figure 8;

Figure 10 is a fragmentary sectional view taken substantially along the line 10—10 of Figure 9;

Figure 11 is a fragmentary sectional view taken substantially along the line 11—11 of Figure 9;

Figure 12 is a cross-sectional view taken substantially along the line 12—12 of Figure 9;

Figure 13 is a front elevational view of a coin integrator and comparator used at the receiving station in cooperation with the coin sorter and coin counter;

Figure 14 is a horizontal sectional view taken substantially along the line 14—14 of Figure 13;

Figure 15 is a vertical sectional view taken substantially along the line 15—15 of Figure 13;

Figure 16 is a fragmentary elevation view taken as indicated at 16—16 in Figure 15;

Figure 17 is a fragmentary rear elevational view of the apparatus shown in Figure 13, Figure 17 being taken in the direction indicated by the line 17—17 in Figure 15;

Figure 18 is a plan view of a recording apparatus used at the receiving station in cooperation with the coin sorting and integrating mechanism;

Figure 19 is a front view of the apparatus shown in Figure 18; and

Figure 20:
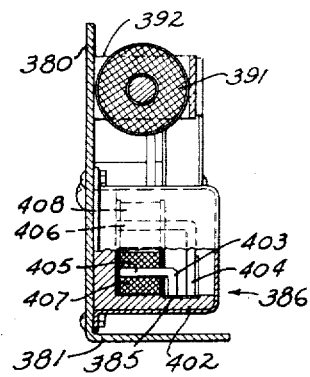

Figure 20 is a cross-sectional view taken substantially along the line 20—20 of Figure 19.

The entertainment distribution system of this invention comprises one or more transmitting stations at which the entertainment material originates and a plurality of remotely situated receiving stations at which the entertainment material is received and reproduced. The transmission of the material to the receiving stations may be over metallic electrical circuits if desired, but the system is particularly adapted to the use of electromagnetic radiations such as are employed as the medium of transmission in the radio and television arts. While the invention is adapted for use with many types of entertainment distribution systems, it is particularly adapted for use with radio or television broadcasting systems, and for this reason the system has been so arranged as to use existing receiving station installations with a minimum of change or adaptation of the existing receiving apparatus.

Referring to the drawings, there is illustrated therein a preferred embodiment of this invention as applied to a television transmitting and receiving system. The television system has been chosen for illustration herein as representative of the distribution of combined aural and visual entertainment. While a television system has been chosen for the purposes of illustration, it will be appreciated that the invention is equally applicable to other types of entertainment distribution systems.

Figure 1:
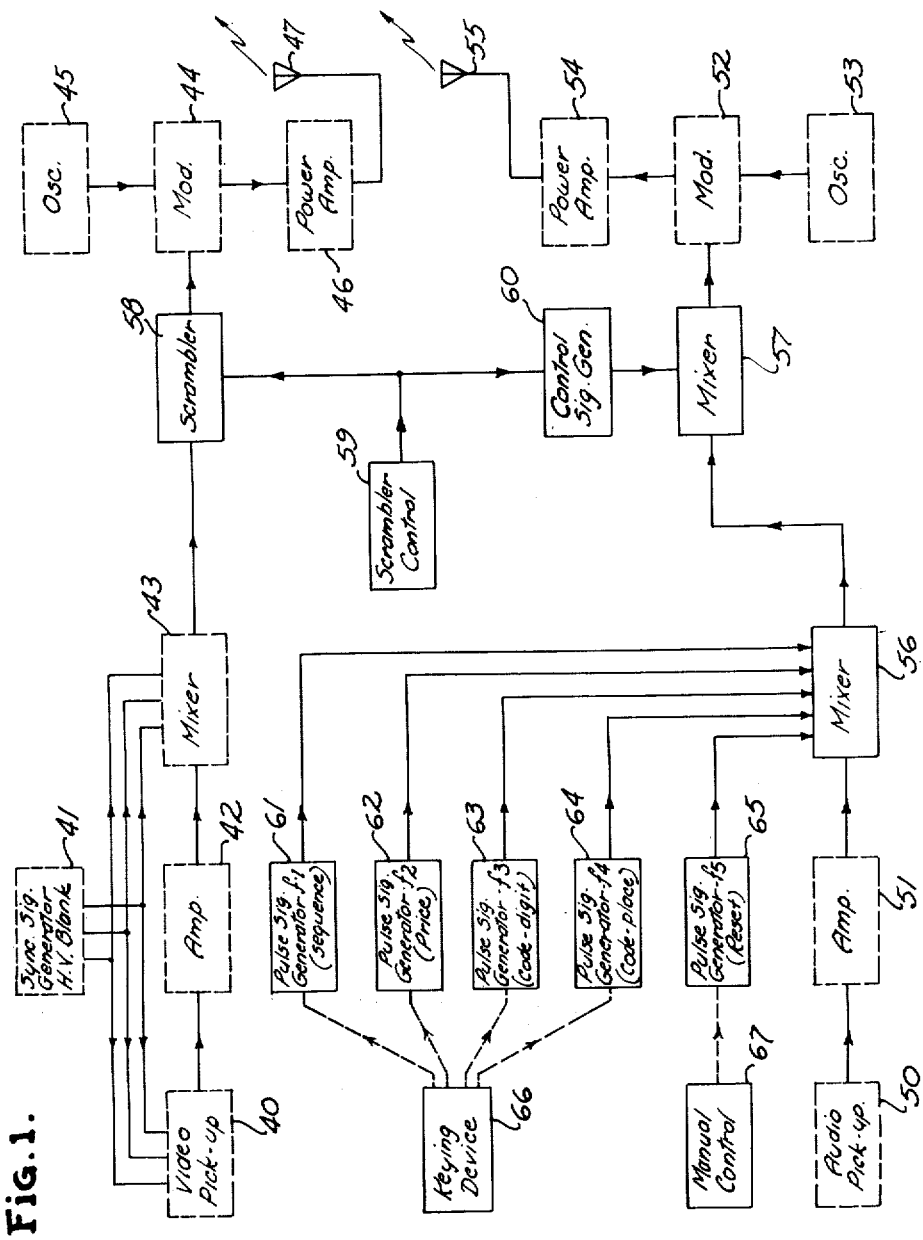
Figure 1 is a block diagram illustrating functionally the apparatus constituting a transmitting station forming a part of the entertainment distribution system of this invention.

Figure 1 is a block diagram illustrating functionally the transmitting apparatus, it being understood that the portion of the system shown in Figure 1 constitutes one transmitting station operating on one assigned channel. The entire system contemplates the use of a number of such transmitting stations each operating upon its own assigned channel so as to provide a choice of programs to the users of the system.

In Figure 1 the apparatus normally included in a television transmitter is represented by rectangles drawn in dashed lines, the additional apparatus constituting the means for preserving secrecy and the means for controlling the coin collection devices of all of the receiving stations are shown in solid lines. Electrical functions are represented by solid lines joining the rectangles and dotted lines are used to indicate mechanical functions.

As is well known, the conventional television transmitter constitutes two separator transmitters, one operating on a first carrier frequency to transmit the video portion of the program, and the other operating on a second and different carrier frequency serving to radiate the audible portion of the program.

The conventional video portion of the transmitting apparatus comprises a video pickup 40 of the electronic scanning type such as the image orthicon or iconoscope. The scanning of the subject is controlled by suitable horizontal and vertical scanning signals and blanking signals derived from a synchronizing signal generator 41. The output of the video pickup 40 is amplified as by a amplifier 42 and fed to a mixer 43 where control signals corresponding to the horizontal, vertical and blanking signals are added to the video signals for the purpose of synchronizing the operation of the image reconstituting device in the receiving apparatus. The combined signals are normally applied to a modulator 44 which serves to modulate a carrier frequency generated by an oscillator 45, the modulated carrier frequency being suitably amplified in a power amplifier 46 and applied to a transmitting antenna 47.

The usual audio portion of a television transmitter comprises an audio pickup 50 such as a conventional microphone, the output of which is amplified by an amplifier 51, and applied to a modulator 52. The modulator 52 serves to modulate a carrier frequency generated by an oscillator 53, the modulated carrier frequency being suitably amplified by a power amplifier 54 and radiated from an antenna 55.

According to the present invention mixers 56 and 57 are interposed in the audio channel between the amplifier 51 and the modulator 52, and a scrambling device 58 is included in the video channel between the mixer 43 and the modulator 44. The mixers 56 and 57 are used to add to the conventional audio signals forming a part of conventional television transmissions certain control signals which are generated by apparatus to be described hereinafter, and the scrambler mechanism 58 is included in the video channel for the purpose of preserving the secrecy of the transmissions and to render them unintelligible to all receivers except those incorporating the coin controlled apparatus described hereinafter.

In the form of the invention chosen for illustration herein, secrecy is preserved by modification of the visual portion of the transmission. This is accomplished through the use of the scrambler 58 which serves to so modify the signals passed from the mixer 43 to the modulator 44 so as to render them unintelligible when received by a conventional television receiver. The scrambler 58 may conveniently comprise any one of a number of known scrambling devices for preserving the secrecy of television transmissions. A preference is expressed however for a polarity reversing scrambling system such as is disclosed and claimed in a copending application Serial No. 161,997, filed May 15, 1950 by Robert E. Gottfried, and assigned to the assignee of this application.

The scrambler 58 is arranged to be controlled by a scrambler control device 59 which operates to vary some parameter of the scrambling function so as to further increase the secrecy of the transmissions. As is disclosed in the aforementioned copending application, the scrambler control 59 may include a chance means serving to vary in a random and unpredictable manner the times of change in the mode of transmitting the video signals. Other forms of control devices may be used which are particularly suited for controlling the operation of any one of the various types of scrambling mechanism which may be employed as the scrambling device 58.

The scrambler control device 59 is used also to simultaneously control a signal generator 60 which feeds the mixer 57 so as to add to the signal radiated from the antenna 55 control signals corresponding to the variations in the parameters of the scrambling functions. In order that these control signals may be separated from the normal audio signals at the receiver and to prevent any interference with the normal enjoyment of the audible portion of the program, the control signals produced by the generator 60 may be of a super-audible frequency lying outside the normal hearing range, or may alternatively be used to modulate an inaudible sub-carrier applied as a modulation to the sound carrier.

The mixer 56 serves to add to the audio portion of the program certain pulse signals produced in a controlled sequence by five pulse generators 61, 62, 63, 64 and 65. Each of the pulse generators 61—65 operates to produce short duration pulse signals comprising a short burst of energy at a super-audible frequency, the frequency generated by the generators 61—65 being different and distinguishing for each pulse generator.

Four of the five pulse generators are mechanically controlled by a repetitive keying device 66, the construction and operation of which is described in detail hereinafter. It is sufficient at this time to point out that the keying device 66 operates the four pulse generators 61—64 in a predetermined timed sequence so as to produce a predetermined number of pulses during a given cycle of operation. The keying device 66 is a continuously operating repetitive mechanism serving to cause the generators 61—64 to repeatedly transmit the sequence of timed and controlled series of pulses, which pulses are added by the mixer 56 to the audio signal which is radiated from the antenna 55.

The pulse generator 61 is tuned to produce pulses of a frequency which may be designated F1. These pulses control the sequence of operations of a pulse distributing mechanism used in the coin controlled receiving apparatus as will be described in detail hereinafter. The pulses generated by the generator 62 may be said to have a frequency F2, and the number of these pulses in a given cycle of operation is intended to represent the established price of the program being transmitted. Conveniently, the programs may be priced in arbitrary units of monetary value, the price of the program being represented by the number of pulses produced by the generator 62 during each cycle of operation. Using for example, an arbitrary unit of measurement of five cents, the price of the program may be indicated over the range from five cents to two dollars through the use of from one to forty pulses following each other in rapid succession.

The pulse generator 63 generates pulses of a third frequency which may be designated F3. These pulses are used in cooperation with the pulses generated by the generator 64 at a different frequency which may be designated F4 to identify the particular program then transmitted. As will be explained in more detail hereinafter, the system herein described contemplates the assignment to each program transmitted by any transmitting station of the system a code number which is individual to that particular program. The code number used may be of the four digit type so that as many as 9,999 separate and distinct programs may be specifically identified by the transmission of the appropriate code number. In using such a system of identification, the pulse generator 63 is caused to transmit in sequence four groups of pulses, each group containing up to nine individual pulses and correspondingly representing some one of the digits from 0 to 9. The groups of pulses produced by the operation of the generator 63 are separated by single pulses produced by the generator 64 which latter pulses thus serve to identify which place in the four place code figure the previously represented digit is intended to occupy.

To briefly summarize the disclosure represented by Figure 1, the transmitting apparatus illustrated therein comprises a conventional television transmitter having a video channel and a separate audio channel. To the video channel is added a scrambling means for producing a secret type of transmission, which scrambling means is controlled by the scrambler control device 59 which also causes control signals to be transmitted over the audio channel to permit synchronous operation of the unscrambling device used in the receiving apparatus. The transmitting apparatus also uses the preset keying device 66 which operates the pulse generators 61—65 so as to transmit also over the audio channel the sequence control signals, the signals representative of the price of the program then being transmitted, and signals representative of the identifying number of the particular program.

The pulse signal generator 65 operates, when actuated by the operation of a manual control device 67, to transmit a pulse of a fifth frequency which may be designated F5. This pulse is used to clear and reset the receiving control apparatus as will be explained in detail hereinafter. The manual control device 67 which actuates the pulse generator 65 is intended for operation at the conclusion of the particular program being transmitted.

Figure 2:
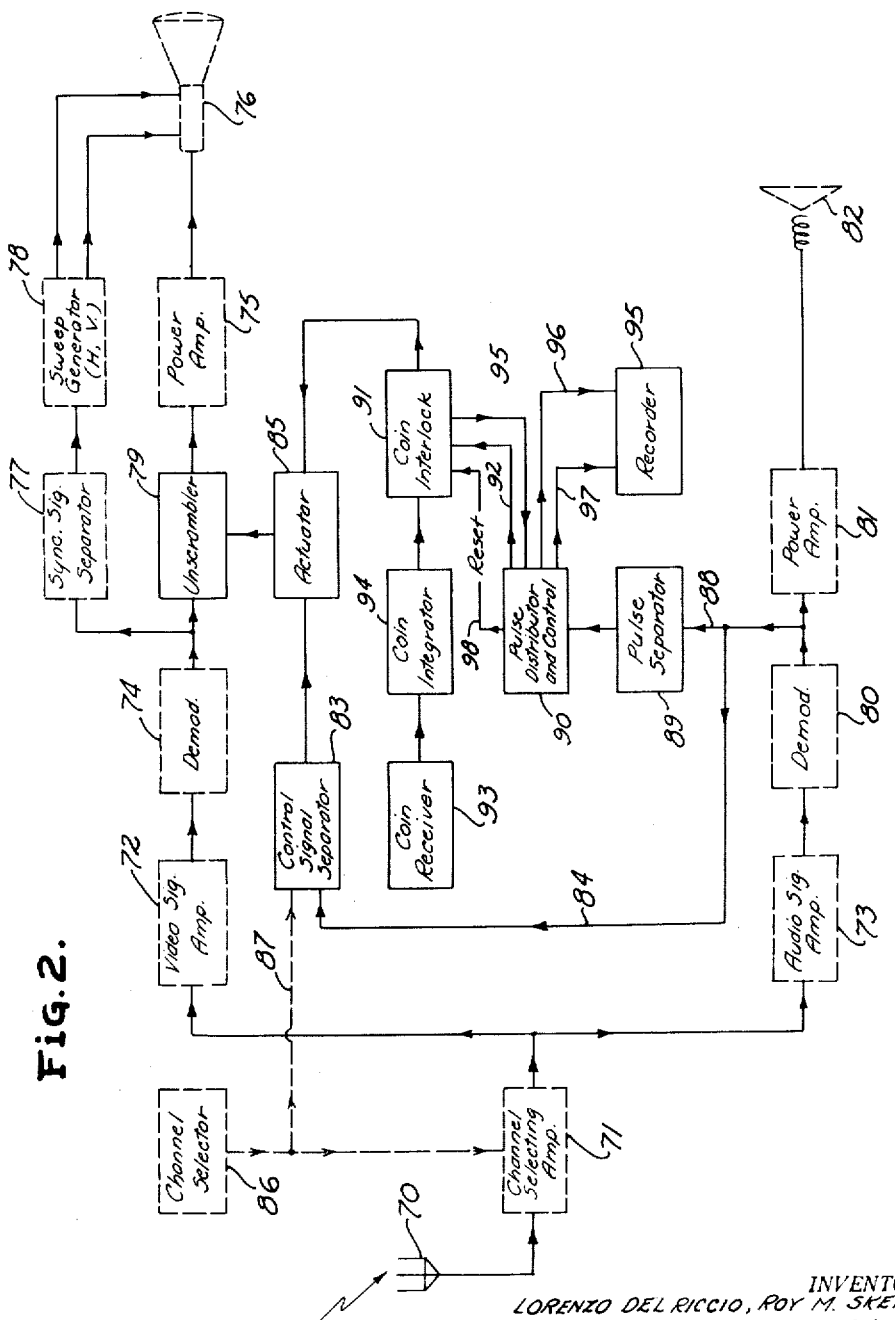
Figure 2 is a block diagram illustrating functionally the apparatus employed at the receiving stations.

The apparatus used at each of the various receiving stations is illustrated functionally by the block diagram constituting Figure 2 of the drawings. As in Figure 1, the apparatus forming the usual and conventional television receiving apparatus is shown in dotted lines, rectangles drawn in solid lines and being employed to indicate the functions performed by the various instrumentalities of the coin collecting control apparatus. Electrical functions are represented by solid lines drawn in the rectangles, and dotted lines are used to indicate mechanical functions.

The radiated television signals are picked up by a receiving antenna 70 and passed through a channel selecting amplifier 71 serving to select from a group of available channels the one carrying the program desired to be received. The output from the amplifier 71 is divided, the video signal being applied to a video signal amplifier 72 and the audio signals being applied to an audio signal amplifier 73. The video signals, after amplification, are demodulated by a demodulator 74, and are normally applied to a power amplifier 75 which drives an image reproducing device 76 which may be of the conventional cathode ray tube type.

The output of the demodulator 74 is also applied to a synchronizing signal separator 77 which serves to extract the synchronizing signals produced at the transmitting stations. The synchronizing signal separator 77 controls the operation of a sweep generator 78 producing suitable control potentials for controlling the horizontal and vertical sweeping functions of the cathode ray tube 76.

Between the demodulator 74 and the power amplifier 75 is shown an unscrambler 79. While the unscrambler 79 is shown as being connected between the demodulator 74 and power amplifier 75, it will be appreciated that in certain cases the unscrambler 79 may merely be connected to the circuit interconnecting the elements 74 and 75, the precise mode of connection of the unscrambler 79 to the balance of the apparatus depending entirely upon the type of scrambling system employed.

The audio signals which are amplified by the audio signal amplifier 73 are detected by a demodulator 80 and applied to a power amplifier 81 which is used to drive a sound reproducing device 82 such as a conventional loud speaker.

The unscrambler 79 is controlled by a control signal separator 83 the electrical input to which is connected as represented at 84 to the output of the audio demodulator 80. It will be recalled that the audio channel carries inaudible control signals generated at the transmitter by the signal generator 69. These signals are separated from the balance of the program by the signal separator 83 and are used to so operate the unscrambler 79 in synchronism with the variable operation of the transmitter scrambler 58 as to effect an unscrambling of the video portion of the program, and thus render the received transmissions intelligible. The unscrambler 79 is rendered operative by the energization of an actuator 85 which is in turn under the joint control of a coin collecting apparatus and the control signal separator 83.

The channel selecting function of the channel selecting amplifier 71 is mechanically controlled by a manually operable channel selector 86 normally mounted on the front panel of the television receiver and provided for the purpose of permitting an operator of the receiver to select the desired one of a plurality of available programs. The channel selector 86 is also mechanically coupled as indicated at 87 to the control signal separator 83 so as to adjust the control signal separator 83 in correspondence with the adjustment of the channel selecting amplifier 71 so as to make the control signal separator 83 responsive only to the control signals which are transmitted by the transmitting station selected by the channel selecting amplifier 71.

The description of the coin collecting apparatus and the other instrumentalities shown in Figure 2, and their mode of operation, may better be understood by assuming certain conditions of operation and tracing the resulting functions of each of the devices.

Assuming that through newspaper notices or other publications giving the details of the various television programs available, a user of the television receiver has determined that he wishes to see and hear the program being broadcast on a given channel. The channel selector 86 is manipulated after the television receiver is placed in operation to select the desired channel in the usual manner. The resulting presentation of the visual portion of the program will be unintelligible due to the scrambling of the video signals effected at the transmitter broadcasting the selected program. The audio signals may or may not be intelligible depending upon the type of scrambling system employed, it being understood that while only scrambling of the video signal has been described herein, it falls within the scope of this invention to scramble also the audio signal.

The output from the audio demodulator 80 is applied as indicated at 88 to a pulse separator 89 which operates to extract from the audio signal the pulses which are superimposed upon the audio signal by the signal generators 61—64 of the transmitting apparatus shown in Figure 1. The pulse separator 89 is connected to a pulse distributor and control mechanism 90, the details and mode of operation of which will be explained in detail in connection with Figure 4 of the drawings.

The pulse signals applied to the pulse distributor 90 contain in addition to the sequencing pulses F1, the pulses F2 representing the established price of the selected program, and the pulses F3, F4 which define the code number identifying the particular transmission then being received. The pulses F1 and F2 so actuate the pulse distributor and control apparatus 90 as to apply the F2 pulses to a coin interlock 91 as indicated at 92 in Figure 2 so as to introduce into that device, as one parameter, the price of the program received by the television receiver.

After appropriately tuning in the selected program, the user of the system, having been advised of the price of the selected program by published announcements in the newspapers and the like, through aural and/or visual announcements on preceding programs, or by indications given by the coin interlock 91, then deposits in a coin receiver 93 the requisite number of coins. The coin receiver 93 is connected to a coin integrator 94 which serves to totalize the monetary value of all of the coins deposited. The coin integrator 94 is coupled to the coin interlock 91 which then operates to compare the monetary value of the coins deposited with the price of the program as represented by the F2 pulses.

Assuming that the proper amount of money has been deposited in the coin receiver, the coin interlock 91 will determine the correspondence between the price of the program and the amount of money deposited, and, in response to such correspondence, operate the unscrambler actuator 85 to cause that device to actuate the unscrambler 79 to thereby render the entertainment produced by the receiver 20 intelligible.

The coin control apparatus includes also a recorder 95, which, as will be explained hereinafter, is normally held in an inoperative condition until the requisite number of coins has been deposited and this fact detected by the coin interlock 91. However, when the coin interlock 91 operates to actuate the unscrambler 79, it also so controls the pulse distributor 90, as is indicated at 95 in Figure 2, as to cause the pulse distributor and control device 90 to place the recorder 95 in operation, as is represented at 96 in Figure 2. The pulse signals F3 and F4 are then applied to the recorder 95 as indicated at 97 to cause the recorder to record these signals to thereby establish, by a coding system which will be explained in connection with Figure 3 of the drawings, a permanent record positively identifying the program for which the deposited monies were paid. This information, together with the information available at the various transmitting stations as to the price of the various programs transmitted, provides all of the data necessary for a proper allocation of the collected coins among the various transmitting stations and among the various producers of television programs.

After the program identification is recorded, the coin control apparatus remains quiescent until the conclusion of the program paid for by the coins deposited in the coin receiver 93, at which time the manual control device 67 at the transmitter is manipulated to operate the signal generator 65 and transmit the clearing or resetting signal F5. This signal is separated from the audio signal by the pulse separator 89 and is applied to the pulse distributor and control device 90. This device passes the reset signal along to the coin interlock in the manner represented at 98 in Figure 2 so as to restore that device to its initial condition. At the same time the pulse distributor and control device 90 is reset to an initial condition preparatory to receiving and acting upon the control and signalling pulses transmitted in connection with a subsequent or different television program.

The resetting of the coin interlock 91 de-energizes the unscrambler actuator 85 so as to render the unscrambler 79 ineffective. The program subsequently transmitted on the selected channel will therefore be unintelligible until the required number of coins is deposited in the coin receiver 93.

Attention is directed to the fact that the addition to a normal television receiver of the coin control apparatus just described does not in any way interfere with the reception of the normal television programs which are transmitted for free consumption without the payment of a fee therefor. This results from the fact that the unscrambler 79 is inoperative to effect any modification of the signal which is transferred from the demodulator 74 to the power amplifier 75 unless it is placed in operation by the operation of the actuator 85. When normal television signals are received the actuator 85 is not actuated and the unscrambler 79 remains inoperative so that the signals which are applied to the power amplifier 75 are the same as are delivered by the demodulator 74. This causes the normal television signals to be reproduced as an entirely normal and intelligible picture by the image reconstituting device 76.

For a more complete understanding of the arrangement of the control pulses which are transmitted from the transmitter to the receiver, and the mode of operation of the coin control apparatus reference should be had to Figures 3 and 4 wherein is illustrated in detail the form and arrangement of the control pulses, and the electrical apparatus employed in the pulse distributor and control device 90, the recorder 95, and the coin interlock 91.

Figure 3 is presented in three separate parts, Figure 3A, Figure 3B, and Figure 3C; Figure 3A representing the functioning of the apparatus at one period of time, Figure 3B representing the functioning at a later period of time, and Figure 3C representing the pulses which are transmitted at a still later period. In each of Figures 3A, 3B and 3C time is represented as the abscissa of a series of five graphs plotted on cartesian coordinates, the five graphs representing respectively the times of occurrence of the pulses having frequencies of F1, F2, F3, F4, and F5, the production of these pulses being controlled as described by the keying device 66 and manual control 67 used at the transmitting station.

The pulses are produced continually during the radiation of the program in a repetitive cyclic fashion. One cycle is so marked in Figure 3A as beginning at a time T0 and extending to a time T2. An identical cycle is represented in Figure 3B as extending from a time T4 to a time T5. Each cycle is considered to begin with the first of a series of pulses at a frequency F1, and during which the pulses F3 and F4 representing the identification of the transmitted program are produced. All pulses are produced at the same periodicity represented by the dimension line *t* in Figure 3A. It will be observed that the F3 and F4 pulses are interspersed between the F1 pulses so that they are received with at least one F1 pulse immediately following each of the F3 and F4 pulses.

In Figure 3 the F3 and F4 pulses have been arranged to indicate the transmisssion of a simple four figure code number to-wit: "4213." The first four pulses 101 represent the first figure "4" and the first F4 pulse 102 indicates the end of the transmission of the first figure. The next two F3 pulses marked 103 in Figure 3A represent the second digit "2" and the second F4 pulse 104 indicates the end of the transmission of the second digit. In the same way, the pulses 105 and 106 represent the third and fourth digits "1" and "3" respectively, and the third and fourth F4 pulses 107 and 108 represent the end of the transmission of the third and fourth digits.

It will be noted that two F1 pulses identified on Figure 3A as 109 and 110 complete the first portion of the cycle and represent the entire and uninterrupted duration of the repetitive transmission of F1 pulses during the first part of the complete cycle. The balance of the cycle is made up of five pulses at a frequency of F2 and represented in Figure 3A by the group marked with the reference character 111. The F2 pulses represent the price of the program being radiated, each pulse representing a unit charge such as five cents. Accordingly, the transmission represented in Figure 3A indicates the price of the program to be 25¢.

As will appear more clearly from the ensuing description of the mode of operation of the apparatus, only a certain portion of the received pulses cause operation of the receiver control apparatus. The particular pulses causing such operation have been distinguished in Figure 3 from the balance of the pulses by blacking in those of the pulses causing such operation.

The description of the apparatus and its mode of operation will perhaps be best understood by assuming certain conditions of operation and carrying the description of the apparatus forward as the operation is described. Let it be assumed that the television receiver is placed in operation and tuned to the transmitting station which is radiating the program identified by the numeral "4213" at a quoted price of 25¢. The time T1 indicated on Figure 3A is intended to represent the time at which the receiver first becomes operative to receive the program so tuned in, the first F1 pulse received subsequent to the time T1 and marked 112 in Figure 3A being the first received pulse which is separated from the audio signals by the pulse separator 89 and applied to the pulse distributor and control device 90.

The first F1 pulse 112 is applied as is represented by conductor 113 in Figure 4 to the grid of a gas discharge tube V1, the cathode of which is grounded and anode of which is connected through circuits now to be described to a supply bus 114 connected to one terminal 115 of a source of alternating current power, the terminal 116 of opposite polarity being grounded as indicated at 117.

The first F1 pulse 112 being applied to the grid of the gas discharge tube V1 renders that tube conductive, and so causes current to flow from the supply bus 114 through a price solenoid PS and by way of conductor 118, normally closed limit switch contact LS*rb*, conductors 119 and 120, and normally closed contacts 2LO*c* of a second lockout relay 2LO and through the gas discharge tube V1 to ground. This causes energization of the price solenoid PS for a period of time equal to the duration of the first F1 pulse 112.

The price solenoid PS is a part of the coin interlock 91 which is described in detail hereinafter. It is sufficient at this time to point out that upon each energization of the price solenoid PS a moving contact is moved a step further away from an initial or rest position. The first operative F1 pulse 112 serves to move that moving contact from a rest position to a zero position so that the ultimate position of said moving contact relative to the zero position will represent the number of F2 pulses which identify the price of the program. The limit switch contact LS*rb* just mentioned, and limit switch contacts LS*ra* and LS1 are operated by the movement of the aforementioned moving contact from its rest position to its zero position.

The initial movement of the moving contact through actuation of the price solenoid PS serves to open the limit switch contact LSrb to de-energize the solenoid PS. In order to insure that the solenoid PS will be energized for a time sufficient to cause the mechanical apparatus actuated thereby to be moved through a full operation as represented by a full stroke of the solenoid PS, the solenoid coil is shunted by a condenser 121. The condenser is fully charged immediately the gas discharge tube V1 is rendered conductive, and discharges the energy so stored through the coil PS when the limit switch contact LSrb is opened. The discharging of the condenser 121 serves to supply to the solenoid PS sufficient energy to insure a full stroke operation of the solenoid.

Coincident with the opening of the limit switch contact LSrb, a limit switch contact LSra is closed, so as to connect the solenoid PS in a circuit extending from the supply bus 114 through the solenoid PS and by way of conductor 122, limit switch contact LSra, conductor 123, a normally closed contact 1LOc of a first lockout relay 1LO, conductor 124, through a normally closed contact 2LOb of the second lockout relay 2LO and conductor 125 to the anode of a gas discharge tube V2. The cathode of the gas discharge tube V2 is grounded, and the grid is connected as is indicated by the conductor 126 to the pulse separator 89 so as to receive any F2 pulses appearing in the output of the demodulator 89.

As will be seen from an inspection of Figure 4, the operation of the limit switch contacts LSrb and LSra disconnects the price solenoid PS from the gas discharge tube V1 so that F1 pulses following the first pulse 112 are not operative to produce any functioning of the solenoid PS, the actuating circuit for the solenoid PS being transferred by the closing of the limit switch contact LSra to the gas discharge tube V2, so as to cause energization of the solenoid PS upon the reception of the next occurring of the groups 111 of F2 pulses. This causes the moving contact of the coin interlock mechanism to be moved to a position representative of the established price of 25¢. Also, the movement of that contact from the zero position to the first position resulted in the closing of the limit switch contact LS1 so as to prepare a circuit for energizing the first lockout relay 1LO, such circuit extending from the supply bus 114 through the coil of the lockout relay 1LO, and by way of conductor 127, limit switch contact LS1, conductor 128, normally closed contact 1LOb of the lockout relay 1LO, conductors 129 and 120, normally closed contact 2LOc of the second lockout relay to the anode of the gas discharge tube V1, so as to energize the lockout relay 1LO upon reception of the next F1 pulse. By reference to Figure 3A it will be seen that this next F1 pulse immediately follows the last of the F2 pulses, such operative F1 pulse being represented by the reference character 130 in Figure 3A.

The F1 pulse 130 renders the gas discharge tube V1 conductive and causes energization of the first lockout relay 1LO through the circuit just described. Upon energization, the relay 1LO opens its normally closed contact 1LOb to disconnect the lockout relay 1LO from the gas discharge tube V1. At the same time a normally open contact 1LOa of the lockout relay 1LO is closed so as to establish a self-holding circuit extending from the supply bus 114 to the coil of the relay 1LO and by way of conductor 131, normally open contact 1LOa, and conductor 132 to a release bus 133. The release bus 133 is connected to ground through a normally closed contact CRb of a clearing relay CR.

The relay coil 1LO is preferably shunted by a condenser 134 so as to give the relay 1LO a slow-to-release characteristic insuring the closing of the normally open contacts 1LOa despite the momentary energization of the relay coil.

Energization of the first lockout relay 1LO also opens the normally closed contacts 1LOc included between conductors 123 and 124 so as to disconnect the price solenoid PS from the gas discharge tube V2. At the same time normally open contact 1LOd of the relay 1LO are closed so as to effect a partial transfer of the gas discharge tube V2 from the price solenoid PS to a first release relay 1R, the normally open contacts 1LOd being connected to a conductor 135 which is in turn connected to the anode of the gas discharge tube V2 through the normally closed relay contacts 2LOd and conductor 125. The transfer of the anode circuit of the gas discharge tube V2 will not, however, be completed until normally open contacts CIc of a coin interlock relay CI are closed, these contacts being connected to the normally open contacts 1LOd by means of a conductor 136.

Energization of the first lockout relay 1LO serves to lock the apparatus in the various operated conditions just described until the user of the television receiver deposits in the coin collecting apparatus an amount of money equal to that represented by the position of the moving contact which has been moved from its rest position by the F2 pulses applied to the price solenoid PS.

The next step in the sequence of operations consists in the deposit of coins in the coin receiver in an amount equal to the established price of the program. As will be made clear hereinafter, coins deposited in the coin receiver are conveyed to a coin box along different coin channels, depending upon the denomination of the coin. In passing along their respective channels, coins of different denominations operate one or the other of two coin switches 1CS and 2CS, these switches being operated for different numbers of times depending upon the denominations of the coins. The coin switch 1CS is connected in a circuit extending from the supply bus 114 through conductor 137, coin switch 1CS, and conductor 138 to a first coin counting solenoid 1CCS, the other terminal of which is grounded. The coin switch 2CS is connected in a circuit extending from the supply bus 114 through a conductor 139 and coin switch 2CS to a conductor 140 which is connected to one terminal of a second coin counting solenoid 2CCS, the other terminal of which is grounded.

As will be explained in detail hereinafter, the coin switches 1CS and 2CS cause such actuation of the coin counting solenoids 1CCS and 2CCS as to cause a second movable contact to be moved from a zero position to a position spaced therefrom a number of steps representing the monetary value of the coins so counted. If the monetary value of the coins so counted equals the price of the program as represented by the position of the first movable contact (so positioned as a result of the repeated energization of the price solenoid PS), the two moving contacts will occupy coincident positions so as to establish an electrical circuit from one of those contacts to the other. The electric switch thus formed is identified in Figure 4 by the reference CIS, and is hereinafter termed a coin interlock switch.

The coin interlock switch CIS is connected to energize a coin interlock relay CI upon the closing of the switch CIS, this circuit extending from the supply bus 114 through the coil of the coin interlock relay CI and by way of conductor 141 through the coin interlock switch CIS and conductor 142 to the reset bus 133. Energization of the coin interlock relay CI closes normally open contacts CIa thereof to complete a self-holding circuit extending from the coil of the relay CI through conductors 141 and 143, normally open relay contacts CIa and conductor 144 to the reset bus 133. The relay CI thus is held energized despite possible subsequent opening of the coin interlock switch CIS. A delayed dropout characteristic is imparted to the relay CI by connecting a condenser 145 in parallel with the coil thereof.

The energization of the coin interlock relay CI represents the payment of the established price of the program. The time of this occurrence may fall at any point in the repetitive sequential transmission of the pulse trains, and such a time is represented in Figure 3B as the time T3.

Energization of the coin interlock relay CI closes normally open contacts CIb thereof which are connected between conductors 146 and 147. These conductors are connected as is indicated by the legend on Figure 4 to the unscrambler actuator 85 in such a manner as to cause operation of that device. Operation of the unscrambler actuator 85 actuates the unscrambler 79 so that the heretofore unintelligible signals reproduced on the image reconstituting device 76 are cleared so as to present a normal and intelligible reproduction for viewing by the subscriber.

Energization of the coin interlock relay CI also closes the aforementioned normally open contacts CIc thereof so as to connect the anode of the gas discharge tube V2 through the coil of a first release relay 1R to the supply bus 114, such circuit including conductors 125, normally closed contacts 2LOd of the second lockout relay 2LO, conductor 135, normally open (now closed) contacts 1LOd of the first lockout relay LO, conductor 136, the aforementioned normally open contact CIc of the coin interlock relay CI, conductor 148, normally closed contact 1Rb of the first release relay 1R, conductor 149 and coil 1R of the first release relay 1R. The other terminal of the relay 1R is connected to the supply bus 114. The completion of this circuit renders the gas discharge tube V2 operative to respond to the first F2 pulse following the payment of the price of the program at the time T3, such next subsequent F2 pulse being identified in Figure 3B by the reference character 150.

The F2 pulse 150, being applied by the conductor 126 to the grid of the gas discharge tube V2, renders the tube V2 conductive so as to energize the relay 1R by way of the circuit just described. Energization of the relay 1R closes normally open contacts 1Ra thereof so as to complete a self-holding circuit for the relay 1R extending from the conductor 149 by way of conductor 151, normally open relay contacts 1Ra and conductors 152 and 153 to the reset bus 133, the reset bus 133 being at this time grounded through the normally closed contacts CRb of the clearing relay CR. At the same time the energization of the relay 1R opens the normally closed contacts 1Rb thereof included between conductors 148 and 149 so as to isolate the relay coil 1R from the anode circuit of the gas discharge tube V2. A slow-to-release characteristic is imparted to the relay 1R by connecting a condenser 154 in parallel with the coil thereof.

Energization of the relay 1R is intended to render the recording apparatus operable so as to produce a permanent recording of the F3 and F4 pulses. To this end, a normally open contact 1Rc is connected to the pulse separator 89 as by means of a conductor 155, the other terminal of the contact 1Rc being connected by a conductor 156 to a first recorder rectifier R1r, the other terminal of the rectifier R1r is connected by conductor 157 to a first recording head R1, the other terminal of the recording head R1 being grounded as shown. In a similar way, a normally open contact 1Rd of the first release relay 1R is connected to energize a second recording head R2, one terminal of which is grounded and the other terminal of which is connected through a conductor 158, a second recorder rectifier R2r, conductor 159, relay contacts 1Rd, and conductor 160 to the pulse separator 89 so as to be made responsive to F4 pulses separated by the pulse separator 89.

The closing of the relay contacts 1Rc and 1Rd thus places the recording heads R1 and R2 in operation so as to record the F3 and F4 pulses which are received between the times T4 and T5 indicated on Figure 3B.

As will be explained in more detail hereinafter, the recording preferably is accomplished magnetically on a conventional magnetic recording medium. The medium is preferably in the form of an oxide coated tape and the recording apparatus is provided with a step-by-step drive mechanism serving to advance the tape one step between each of the F3 and F4 pulses. The apparatus is arranged to employ the entire series of F1 pulses as the means for so operating the tape drive mechanism, this entire series being represented in Figure 3A by the blacked-in F1 pulses occurring subsequent to the time T4.

In order that this mode of operation may result, normally open contacts 1Re of the first release relay 1R are connected as by means of conductors 161 and 162 to a tape drive solenoid TDS, the other terminal of which is connected to the supply conductor 114. Each F1 pulse thereafter applied to the conductor 113 renders the gas discharge tube V1 conductive, and causes current to flow from the supply bus 114 through the tape drive solenoid TDS, conductor 162, relay contact 1Re, conductors 161, 129 and 120, normally closed relay contact 2LOc of the second lockout relay 2LO, and through the gas discharge tube V1 to ground. The resulting repetitive energization of the tape drive solenoid TDS advances the recording medium one step after the recording thereon of each F3 or F4 pulse.

Closing of the relay contact 1Re also connects the conductor 161 to a conductor 163, through a normally closed contact Tb of a transfer relay T, conductor 164, and operating coil of the relay T to the supply bus 114 so as to energize the transfer relay T by the first of the F1 pulses received following the energization of the first release relay 1R.

The energization of the relay T opens the normally closed contacts Tb thereof so as to disconnect the relay T from the conductor 163. At the same time a self-holding circuit for the relay T is established, extending from the supply bus 114 through the coil of the relay T, conductor 165, normally open contact Ta of the relay T, and conductor 166 to the reset bus 133. The relay T is given a slow-to-release characteristic by connecting a condenser 167 in parallel with the coil thereof.

Energization of the transfer relay T connects the second lockout relay 2LO to the anode of the gas discharge tube V2 through a circuit which extends from the supply bus 114 through the coil of the relay 2LO, conductor 168, normally open relay contact Tc of the transfer relay T, conductor 169, normally closed contact 2LOb of the relay 2LO, conductor 170, normally open (now closed) contact CIc of the coin interlock relay CI, conductor 136, normally open (now closed) relay contact 1LOd of the first lockout relay 1LO, normally closed contact 2LOd of the second lockout relay 2LO and conductor 125 to the anode of the gas discharge tube V2.

By virtue of the circuit just described, the first F2 pulse which is applied by the conductor 126 to the grid of the gas discharge V2 following the train of F1 pulses occuring immediately after the time T4 indicated in Figure 3B causes energization of the second lockout relay 2LO, such operative F2 pulse being represented in Figure 3B by the reference character 171. It will be seen that this pulse occurs after the F3 and F4 pulses identifying the received program are applied to the recording heads R1 and R2 so that the second lockout relay 2LO is not energized until the complete identification of the received program is recorded.

When the relay 2LO is energized it comletes a self-holding circuit extending from the supply conductor 114 through the coil of the relay 2LO and by way of conductor 172, normally open contact 2LOa of the relay 2LO, and conductor 153 to the reset bus 133. At the same time, the relay 2LO is disconnected from the anode circuit of the gas discharge tube V2 by the opening of the normally closed contacts 2LOb thereof connected between conductors 169 and 170. The relay 2LO is given a slow-to-release characteristic by connecting a condenser 173 in parallel with the coil thereof.

Also, when the second lockout relay 2LO is energized normally closed contacts 2LOc and 2LOd thereof connected respectively in series with the anodes of the gas discharge tubes V1 and V2 are opened so as to isolate these gas discharge tubes and make the system thereafter non-responsive to the reception of F1 and F2 pulses.

The apparatus then remains in the condition just described, and continues to remain in that condition until the end of the transmitted program. At the end of the program, the keying device 66 at the transmitter is turned off as, for example, at the time T6 in Figure 3C. Immediately thereafter, the manual control device 67 at the transmitter is actuated, as for example at the time T7 represented in Figure 3C. This causes the transmission of an F5 clearing pulse shown at 174 in Figure 3C.

This F5 pulse, separated by the pulse separator 89, is applied as indicated by conductor 175 to the grid of a gas discharge tube V5, to render the same conductive. Power then flows from the supply bus 114 through the coil of a clearing relay CR, conductor 176, and from anode to cathode of the gas discharge tube V5 to ground, thus energizing the clearing relay CR. The clearing relay CR is given a slow-to-release characteristic by the connection of a condenser 177 in parallel with the coil thereof.

Normally open contacts CRa of the clearing relay CR are connected to energize clearing magnets 1CM and 2CM which are connected in series between the supply bus 114 and ground through conductors 178, 179, relay contact CRa and conductor 180. As will be explained in more detail hereinafter, the resulting energization of the clearing magnets 1CM and 2CM operates to restore the coin interlock apparatus and the coin integrating apparatus to the initial or rest position.

Also, energization of the clearing relay CR opens the normally closed contacts CRb thereof, which are connected between the reset bus 133 and ground, thus interrupting the self-holding circuits for the relays T, 1LO, 1R, 2LO and CI so as to restore all of the control instrumentalities comprising the pulse distributor and control device 90 to their initial position ready for actuation upon the reception of the next paid program transmitted by the transmitting station. A similar resetting of the mechanism can be effected at any time by the actuation of a manual clearing switch MCS which is connected in parallel with the contacts CRa of the clearing relay CR and preferably mounted on the coin collecting device in a position to be readily accessible for use by user of the system.

To briefly summarize the sequence of operation of the instrumentalities comprising the pulse distributor and control device 90 it will be seen that the first F1 pulse 112 following the placing of the receiving apparatus in operation serves to ready the coin interlock for the recording of the F2 pulses to establish the price of the program. These pulses are shown in Figure 3A as the group 111. The immediately following F1 pulse 130 locks the equipment out until such time as the quoted price of the program is paid by the deposit of coins of the required value. These coins are segregated, their value determined, and the aggregate value of the coins so deposited is integrated so as to cause actuation of the coin interlock when the requisite amount of money has been deposited. This clears the program so that it may be received and enjoyed by the user of the system.

The F2 pulse 150 immediately following the payment of the price transfers the control to cause the recording apparatus to record the identification of the program for the reception of which the money was deposited. These pulses which are used for the recording function have been blacked in in Figure 3B following the time T4. After the identification of the program is recorded, the next following F2 pulse 171 serves to lock the entire equipment out and hold the same in its then operated condition until the end of the program, at which time the transmission of the clearing pulse 174 serves to clear all of the apparatus and restore it to its initial condition ready for the reception of the next paid program.

As hereinbefore explained with reference to Figure 1, the various pulse signals represented in Figure 3 are produced by a controlled operation of the pulse signal generators 61—64, these generators being controlled by an automatic keying device 66. Preferably the keying device 66 utilizes a tape which is prepared in advance, a separate tape being prepared for each of the programs to be transmitted by the transmitting station, and the tapes being so arranged as to carry the proper identifying number of the program, and the proper representation of the price to be charged for the program.

In Figure 5 there is illustrated a section of tape which may be used as above-described, a perforated tape being illustrated by way of example. In Figure 5 a fragment of the tape is represented by the reference character 200. This tape is provided along one edge with sprocket holes 201 for cooperation with a drive mechanism to be used in moving the tape lengthwise. The tape is also provided with four longitudinally extending rows 202—205 of perforations 206, the rows 202—205 corresponding to the pulse frequencies F1—F4, and the perforations 206 corresponding to the individual pulses to be transmitted at the corresponding frequency. Figure 5 has been drawn to correspond with Figure 3B, and the same one cycle is marked on Figure 5 as is represented on Figure 3 between the times T4 and T5.

The mechanism which is actuated by the perforated tape 200 is illustrated in Figures 6 and 7. The tape 200 after being suitably perforated in the manner described is wound upon a supply reel 207 which is removably mounted on a supporting spindle 208 carried by a base plate 209. One end of the tape 200 is unwound from the spool 207 and is passed over an idler sprocket 210 into contact with which the tape 200 is held by means of a spring pressed idler roller 211, rotatably mounted upon an arm 212 and urged in a counterclockwise direction as viewed in Figure 6 by a tension spring 213.

After passing over the idler sprocket 210, the tape 200 passes through a gate mechanism between an anvil 214 and a contact assembly indicated generally at 215. After leaving the gate construction, the film strip 200 is passed about a driving sprocket 216 and the end engaged with a takeup spool 217 which is removably mounted upon a shaft 218 and drivably engaged therewith. A spring-pressed idler 219 mounted upon a pivoted arm 220 spring-urged in a clockwise direction by a tension spring 221 serves to hold the perforated tape 200 into operating engagement with the driving sprocket 216.

The driving sprocket 216 is mounted upon a shaft 221 which is connected as by means of bevel gears 222 and 223 to a driving motor 224 supported upon the back of the base plate 209. A pulley 225 secured to the driving shaft 221 and connected by means of a spring belt 226 to a pulley 227 secured to the takeup shaft 218 serves to provide a driving connection between the driving sprocket 216 and the takeup spool 217 so as to wind the tape upon the takeup spool 217 as it is fed thereto by the rotation of the driving sprocket 216.

In the form of the apparatus illustrated in Figures 6 and 7, the driving motor 224 is preferably of the synchronous type so as to cause the tape 200 to be moved past the contact assembly 215 at a known fixed rate. The length of tape mounted upon the supply spool 207 is selected to correspond to the duration of the program represented thereby so that at the conclusion of the program all of the tape will be carried by the takeup spool 217. The filled spool 217 and the emptied spool 207 may then be readily removed from their respective spindles and replaced with the tape corresponding to the program next to be transmitted.

The anvil 214 is provided with four insulating sleeves 228 within which are mounted stationary contacts 229, each adapted to be engaged by a corresponding spring contact 230 bearing against the opposite side of the tape, it being understood that the contacts 229 and 230 are so located transversely of the tape as to be alined with the rows 202—205 of perforations 206. As each perforation passes the contacts 229, 230, the spring-pressed contact 230 will move upwardly through the perforation and engage the stationary contact 229 so as to momentarily complete an electric circuit between these contacts. The four electrical circuits so intermittently completed are connected respectively to the pulse signal generators 61—64 so as to key the operation of those generators in the manner described.

The spring-pressed contacts 230 are preferably mounted upon insulating supports 231 and 232 suitably secured to the base plate 209.

While the keying mechanism 66 has been described as employing prefabricated tapes having lengths corresponding to the duration of the respective programs, it will be appreciated that the spools 207 and 217 may be replaced with idler rollers to permit the tape 200 to be made of relatively short length and in endless fashion, passing from the drive sprocket 216 around spring-pressed idler 219 under the two idler rollers substituted for the spools 217 and 207 and then between the spring-pressed idler 211 and the idler sprocket 210 to pass through the contact mechanism as described. If this construction is employed, the prepared tapes will be endless and the driving rate of the driving sprocket 216 will be adjusted to cause a single complete revolution of the endless tape to require a time equal to a whole number of the complete cycle of transmissions such as is represented on Figure 5, as for example 2, 3, or some larger whole number of such cycles.

Figures 8 through 12 illustrate the details of construction of one form of coin collection mechanism which may be used with the system of this invention. The coin collection mechanism shown in these figures constitutes the coin receiver 93 hereinbefore mentioned in connection with Figure 2 of the drawings, and comprises a coin sorting means for sorting coins according to denomination and conveying those coins from the coin receiving slot to a coin box where they are stored until collected by an authorized agent of the operators of the system. In passing from the coin slot to the coin receiver, the segregated coins cause electrical signals to be produced, which signals are representative of the denominations of the coins and are used to operate the coin integrator 94 mentioned in connection with Figure 2.

The coin sorting mechanism which is indicated generally by the reference character 250 in Figure 8 is secured within a suitable housing 251 in a position to communicate with a coin box 252 mounted in the lower part of the housing 251 in such a way as to be readily removable therefrom. The coin sorter 250 defines at its upper end a coin receiving aperture 253 or coin slot which communicates with a similarly shaped opening 254 formed in the upper surface of the housing 251. The coin slot 253 is dimensioned to freely receive all coins up to and including fifty cent coins and communicates with a series of coin channels which pass downwardly through the mechanism and into the coin box 252. The coin sorter 250 comprises two sets of coin channels, the uppermost set being defined by upper and lower cover plates 255 and 256 held in parallel spaced relation to each other by three triangular spacer plates 257, 258 and 259 disposed between the plates 255 and 256. The plates 257—259 have a thickness slightly exceeding the thickness of a fifty cent coin and are disposed in mutually spaced relation to define a coin channel leading from the coin slot 253 to a discharge opening 260 positioned to allow coins emerging therefrom to drop into the coin box 252.

The coin channel defined between the cover plates 255 and 256 comprises two parts, the upper part extending downwardly from the coin slot 253 and then in inclined fashion downwardly and to the right as viewed in Figure 9, being defined between an upper edge surface 261 of the plate 257 and a lower edge surface 262 of the upper plate 258. At the extreme righthand side of the mechanism as viewed in Figure 9, the coin channel abruptly reverses direction and inclines downwardly and to the left to the discharge aperture 260, this portion of the channel being defined between a lower edge surface 263 of the plate 257 and an upper edge surface 264 of the plate 259.

Twenty-five and fifty cent coins dropped in the coin slot 253 traverse the entire length of the upper coin channel just described, first rolling along the edge surface 261 until the righthand end of that surface (indicated at 265 in Figure 9) is reached. The coins then fall vertically to the lower edge surface 264 and pass along the lower pass of the channel to be discharged through the discharge opening 260.

An electric switch 266 suitably supported upon the plate 256 is so actuated by the passage of the twenty-five cent and fifty cent coins along the upper coin channel as to produce one electrical impulse for the twenty-five cent coin and two electrical impulses for fifty cent coins. The switch 266 is of the rotary snap action type utilizing an actuating spindle 267 and a snap action mechanism of such character that a very small angular displacement of the spindle 267 will actuate the contacts. Switches of this character are commercially available, being manufactured and sold by the Microswitch Corporation of Chicago.

An upper actuating arm 268 is secured to the spindle 267 and is pivotally secured at its upper end to a horizontally extending drag link 269. Conveniently, the arm 268 and drag link 269 are formed of small diameter rod or wire and the pivotal connection of the adjacent ends of these members may be conveniently formed by interengaged eyes formed on the ends of the members as indicated at 270. The righthand end of the drag link 269 is bent upwardly in hairpin fashion as represented at 271 in Figure 8, and is passed through a suitable elongated slot 272 formed in the plates 255, 258 and 256.

The dimensions and position of the slot 272 are so selected as to dispose the hairpin portion 271 a distance above the coin channel edge surface 261 sufficient to allow a twenty-five cent coin to pass freely beneath the hairpin portion 271, but sufficiently close to the edge 261 of the coin channel as to be engaged by a fifty cent coin passing along the channel. The slot 272 is angularly disposed relative to the edge 261 of the coin channel so that when the hairpin portion 271 is engaged by a fifty cent coin, the drag link 269 will be moved to the right to rotate the spindle 267 a distance sufficient to actuate the switch 266. After having moved such a sufficient distance, the hairpin portion 271 becomes spaced from the coin channel edge 261 a distance sufficient to allow the fifty cent coin to pass beneath the hairpin portion 271 and continue its travel along the coin channel.

A lower switch arm 273 is secured to the spindle 267 and is extended upwardly through an arcuate slot 274 formed in the plates 255 and 256 and intersecting the lower pass of the coin channel, the portion of the switch arm 273 which extends across the coin channel being identified by the reference character 275 in Figure 8. The portion 275 of the switch arm 273 is normally so positioned in the lower pass of the coin channel as to be engaged by coins of either twenty-five or fifty cent denominations. These coins move the switch arm 273 to the left a distance sufficient to actuate the switch 266 and allow the coins to move past the coin engaging portion 275 and emerge from the discharge opening 260.

It will be seen that the deposit of a twenty-five cent coin in the coin slot 253 causes the switch 266 to be actuated once, due to the fact that the twenty-five cent coin passes the upper coin engaging portion 271 without engaging the same, the switch being operated only upon engagement with the lower switch actuator 275. A fifty cent coin, on the other hand, causes two successive actuations of the switch 266 resulting first from engagement with the coin engaging portions 271 and thereafter by engagement with the coin engaging portion 275. Using as a unit of monetary measurement a value of five cents, it will be seen that the switch 266 operates to indicate that a twenty-five cent coin contains one group of five unit valuations, and similarly operates to indicate that a fifty cent coin contains two such groups of five unit valuations.

A second set of coin channels disposed behind and below the upper coin channel is defined by cover plates 276 and 277 which are held in a suitable spaced relation to each other by spacer members indicated generally in Figure 8 at 278. One of these channels extends upwardly from a discharge opening 279 to a position directly behind the lower pass of the upper coin channel at which point the coin channel is enlarged as by interconnecting members 280 and 281 to form a transition section connecting the coin channel with a rectangular aperture 282 formed within the lower cover plate 256 of the upper coin channel positioned to communicate with the lower pass of the upper channel.

As is indicated by the dimension line bearing the legend "5¢," the vertical dimension of the rectangular aperture 252 is made substantially equal to, but slightly exceeding, the diameter of a five cent coin so that a five cent coin rolling along the lower edge 264 of the coin channel may fall through the aperture 282. The vertical dimension of the aperture 282 is made less than the diameter of a twenty-five cent coin so that only five cent coins may fall through the aperture 282.

Five cent coins passing through the aperture 282 are thus segregated from the twenty-five and fifty cent coins and are caused to pass into the coin box 252 through the discharge opening 279 instead of the discharge opening 260 from which the twenty-five cent and fifty cent coins emerge.

A second rotary snap action switch 283 suitably secured to the plate 256 is arranged to be actuated by the five cent coins. The switch 283 may be identical with the switch 266 above described, and may include a spindle 284 to which is attached a switch arm 285 extending downwardly and to the left from the switch 283 as viewed in Figure 9. At the lower end of the arm 285 there is attached an auxiliary arm 286 pivotally joined in any suitable fashion to the lower end of the arm 285 and having an upwardly turned coin engaging portion 287 extended through a vertical slot 288 in the lower portion of the coin channel communicating with the discharge opening 279.

A five cent coin passing through the aperture 282 and along the five cent coin channel engages the switch arm portion 287 to move the same downwardly along the slot 288. This results in a counterclockwise rotation of the spindle 284 and actuates the switch 283. The side edges of the coin channel leading to the discharge opening 279 are terminated short of the lower end of that channel as is indicated at 289 and 290 in Figures 9 and 10. This allows a five cent coin to escape through the gap between the switch arm portion 287 and the lower end 290 of the side edge of the channel when the switch arm portion 287 has been moved a distance sufficient to actuate the switch 283.

A similar mechanism employing a suitably sized aperture 291 communicating with the upper pass of the upper coin channel is used to segregate the ten cent coins and convey those coins to a coin channel 292 defined between the plates 276 and 277. The channel 292 passes downwardly from the aperture 291 and curves to the left to connect with the five cent coin channel at a point above the switch arm portion 287. An arcuate slot 293 communicating with the channel 292 receives an upwardly turned portion 294 of the switch arm 285 so that a ten cent coin passing downwardly along the channel 292 moves the switch arm 285 and spindle 284 in a counterclockwise direction. When the arm 285 has been moved a distance sufficient to cause actuation of the switch 283, the ten cent coin is allowed to escape through the space between the coin engaging portion 294 and the upper terminal edge 295 of the coin channel 292. After passing that terminal edge, the ten cent coin engages the switch arm portion 287 to cause a second and subsequent operation of the switch 283, the coin finally escaping through the gap between the switch arm portion 287 and the lower edge 289 of the coin channel.

It is thus seen that the ten cent coins are also segregated from the twenty-five cent and fifty cent coins and are caused to operate the switch 283 twice by reason of the successsive engagement of the coin with the switch actuators 294 and 287. The switch 283 thus functions upon the deposit of a five cent coin and the resulting single actuation of the switch to indicate that a five cent coin contains one unit of monetary value, and also serves to indicate as a result of the two operations thereof caused by the deposit of a ten cent coin to indicate that such ten cent coin contains two units of monetary value.

The way in which the indications given as described by the switches 266 and 283 are used to integrate and indicate the total monetary value of all coins deposited is explained in detail in connection with the coin integrator and coin interlock mechanism illustrated in Figures 13 through 17.

The coin sorting device 250 includes also a mechanism for rejecting one cent coins. This mechanism comprises a rectangular aperture 296 sized to pass one cent coins but to exclude five cent coins and communicating with a coin channel 297 defined between the plates 276 and 277. The coin channel 297 extends downwardly and to the right as viewed in Figure 9 and communicates with a discharge opening 298 which is alined with a suitably shaped opening in the outer housing 251. Thus, one cent coins deposited in the coin slot 253 pass along the upper coin channel 261 until they reach the aperture 296. By reason of the sizing of the aperture 296, the one cent coins fall through that aperture and into the coin channel 297 by which they are led to the discharge aperture 298 and returned to the person depositing such coins.

The upper cover plate 255 of the upper coin channel assembly serves also to support a momentary contact push button switch 299 so positioned as to be operated upon the depression of a push button 300 suitably mounted in the upper portion of the cover 251. The switch 299 comprises the manual control switch MCS mentioned with reference to Figure 4 and used to reset the entire coin collecting and control mechanism whenever it is desired to change programs before the conclusion of the program then being received.

The coin integrating mechanism which is operated by the coin switches 266 and 283 is illustrated in Figures 13 through 17. As shown in those figures, the coin integrator is combined with and forms a cooperating part of the coin interlock 91 previously mentioned with reference to Figure 2.

As is best seen in Figures 14 and 15, the apparatus comprises a pair of spaced side plates 310 and 311 held in parallel spaced relation to each other by a transverse base plate 312 and a plurality of transversely extending spacer members such as are shown at 313. A transversely extending indicating shaft 314 is suitably journalled for rotation in the side plates 310 and 311. One end of the shaft 314 protrudes beyond the face of the side plate 310 and has secured thereto as by means of a pin 315 an indicating disk 316 upon which indicia 317 (Figure 16) are inscribed at suitable angular intervals in a circumferentially extending progression located near the peripheral edge of the disk. The indicia 317 are representative of the integrated monetary value of coins deposited in the coin slot 253.

The entire mechanism is enclosed within a suitable housing 318 formed for example of sheet metal. The front face of the housing 318 is provided with a viewing aperture or window 319 disposed in a position to allow the indicia 317 to be viewed one at a time through the window 319. By rotating the shaft 314 to a position representative of the total value of coins deposited, that monetary value is indicated by the positioning of the appropriate indicia 317 behind the window 319.

Mechanism is provided for rotating the shaft 314 to an angular position representative of the total monetary value of coins deposited. This mechanism includes a pair of solenoids 320 and 321 secured in an upright position by any suitable means to the base plate 312. Each solenoid includes a plunger 322 which is urged upwardly by means of a compression spring (not shown) disposed within the bore of the solenoid coil below the lower end of the plunger 322. The upper position of each of the plungers is defined as by means of stop screws 323 adjusted to provide a stroke of predetermined length for each of the solenoids 320 and 321.

The plunger of the solenoid 321 is connected by means of a drag link 324 to the outer end of an oscillatable arm 325 which is journalled upon the shaft 314 for oscillating movement relative thereto by means of a hub portion 326 surrounding the shaft 314 and freely rotatable thereon. An actuating arm 327 extends outwardly from the hub 326 at a location diametrically opposite the oscillatable arm 325. To the outer end of the actuating arm 327 there is pivotally mounted an arcuate pawl member 328 which is normally urged upwardly by means of a tension spring 329 connected between the arm 325 and an arcuately extending tail piece portion 330 of the pawl 328. The pawl 328 includes a pawl tooth 331, adapted to operatively engage the teeth of a ratchet wheel 332.

The ratchet wheel 332 is secured as by means of axially extending pins 333 to a hub member 334 which is in turn made fast to the shaft 314 as by a cross pin 335. With this construction an angular movement of the oscillatable arm 325 in a counterclockwise direction as viewed in Figure 13 through an angle equal to the angular spacing of the teeth of the ratchet wheel 332 will result in imparting a corresponding angular rotation to the shaft 314. The angular spacing of the indicia 317 is selected to correspond with the angular spacing of the teeth of the ratchet wheel, so that by so moving the shaft 314, one of the indicia 317 may be moved out of the window 319 and replaced by the next higher indicia.

The arm 325 is spring-urged to its normal position as by means of a tension spring 336 and clockwise movement of the arm 325 under the influence of the spring 336 is permitted by reason of the pivotal mounting of the pawl 328. During such clockwise movement of the arm 325 the ratchet wheel 332 is held stationary by means of a detent 337 mounted upon the upper end of the plunger 338 of a release magnet 339.

The solenoid 321 corresponds to the coin counting solenoid 1CCS mentioned with reference to Figure 4. This solenoid is connected in circuit with the coin switch 1CS shown at 266 in Figure 9, so that the solenoid 321 will be energized once for each five cent coin deposited and twice for each ten cent coin deposited. The length of stroke of the solenoid 321 is adjusted to cause a unit angular movement of the ratchet wheel 332 in response to each energization of the solenoid 321.

The plunger of the solenoid 320 is also connected to the oscillatable arm 325, a drag link 340 being employed for this purpose. The drag link 340 is pivotally connected to the oscillatable arm 325 at a point intermediate the ends thereof. The length of stroke of the solenoid 320 and the location of the pivotal attachment of the drag link 340 to the oscillatable arm 325 are so chosen as to cause a single stroke of the solenoid 320 to result in the moving of the ratchet wheel 332 through five of its unit angular displacements represented by the spacing of the ratchet teeth.

The solenoid 320 comprises the second coin collecting solenoid 2CCS mentioned with reference to Figure 4. As was described in connection with that figure, the solenoid 320 is connected in circuit with the second coin switch 2CS which is shown in Figure 9 at 283. This switch is operated once by the deposit of a twenty-five cent coin and twice by the deposit of a fifty cent coin. Since the solenoid 320 operates to move the ratchet wheel 332 through five of its unit angular displacements it will be seen that the deposit of a twenty-five cent coin moves the ratchet wheel 332 through five notches, whereas the deposit of a fifty cent coin will cause the ratchet wheel 332 to be moved ten spaces.

It will be seen that the structure thus far described cooperates with the coin separating mechanism described with reference to Figures 8 through 12 in such a way as to indicate at the viewing aperture 319 the total monetary value of all coins deposited in the coin slot 253.

The clearing magnet 339 corresponds to the first clearing magnet 1CM mentioned with reference to Figure 4. In describing the circuits shown on Figure 4 it was pointed out that the clearing magnet 1CM was connected in an operative circuit with the manual clearing switch MCS and also with a contact of the clearing relay CR. By reference to Figure 13 it will be seen that energization of the clearing magnet 339 will move the plunger 338 thereon downwardly so as to disengage the detent 337 from the ratchet wheel 332. At the same time, the operating pawl 328 is moved downwardly to disengage the tooth 331 from the ratchet 332, this operation being obtained by passing the pawl tail piece 330 through a suitable aperture formed in the detent 337 as is best shown at 341 in Figure 15.

It will be seen that energization of the clearing magnet 339 releases the ratchet wheel 332 so as to render the same free to be rotated to an initial position indicating zero at the viewing aperture 319. Such resetting rotation of the ratchet wheel 332 is obtained by means of a spiral spring 342 of the clock spring type which is mounted within a suitable housing 343 secured as by the pin 333 to the hub member 334. One end of the spring 343 is secured to the housing 342 and the other end of the spring is secured as by means of a pin 344 to a fixed contact plate 345 held in parallel spaced relation to the side plates 310 and 311 by the spacer members 313 hereinbefore mentioned.

The clock spring 342 operates upon release of the pawl 328 and detent 337 to move the shaft 314 in a counterclockwise direction to its initial position, in which position the figure "zero" is presented at the viewing aperture 319.

As has been hereinbefore mentioned, the coin interlock 91 comprises a pair of movable contacts, one of which is movable to a position representative of the price of the program, and the other of which is movable to a position representative of the monetary value of the coins deposited. Operation of the unscrambler actuator results when both contacts occupy identical positions. In the apparatus shown in Figures 13 through 17, the contact which is movable to a position representative of the monetary value of the coins deposited is shown at 350 and comprises a spring contact arm secured to a driving disk 351 which is in turn secured to the hub 334 by the aforementioned pins 333. The spring contact 350 is thus caused to move with the shaft 314, and is therefore caused to assume an angular position representative of the total amount of money indicated by the coin integrating and indicating apparatus.

During its angular movement the contact 350 traverses a series of fixed contact points 352 mounted upon the contact support 345 and extending completely through that support so as to present exposed surfaces on both faces of the support. The contacts 352 are angularly spaced in accordance with the angular spacing with the teeth of the ratchet wheel 332 so that the contact 350 is caused to move from one fixed contact 352 to the next adjacent contact for each five cents of monetary value registered by the coin integrating mechanism.

The contact which is movable to a position representative of the price of the program is indicated in Figures 13–17 at 353, and comprises a spring arm which is substantially identical to the contact arm 350. The spring contact 353 is secured to a driving disk 354 which is in turn secured as by means of a plurality of longitudinally extending pins 355 to a sleeve member 356 which is mounted upon the shaft 314 for free rotation relative thereto. The pin 355 serves to secure also to the sleeve 356 a ratchet wheel 357 which is identical to the ratchet wheel 332 previously described. The ratchet wheel 332 is arranged to be rotated by the energization of a solenoid 358.

The solenoid 358 is connected to drive the ratchet wheel 357 through a mechanism which is similar in all material respect to the mechanism used for driving the ratchet wheel 332, such mechanism including a drag link 359, oscillatable arm 360, pawl 361, and holding detent 362 arranged to be actuated by a clearing magnet 363. The teeth of the ratchet wheel 357 are given the same angular spacing as is employed on the ratchet wheel 332, and the stroke of the solenoid 358 is arranged to cause the ratchet wheel 357 to be advanced one tooth for each energization of the magnet 358.

The magnet 358 comprises the price solenoid PS described with reference to Figure 4, in which description it was pointed out that the price solenoid PS was energized by signals transmitted from the transmitting station once for each five cent unit of value of the price of the program being transmitted. The pulsing of the price solenoid 358 thus causes the arm 353 to be moved into engagement with that one of the contact buttons 352 which is representative of the established price of the program. When the corresponding amount of money is deposited in the coin slot 253, the other switch arm 350 is moved to an identical angular position to engage the opposite face of the same contact button carried by the contact support 345. The coincidence in angular position of the switch arms 350 and 353 thus completes an electric circuit, such electric circuit being illustrated in Figure 4 as including the coin interlock switch CIS and the coin interlock relay CI.

In order that energization of the clearing magnet 363 may cause the return of the switch arm 353 to its initial position a clock spring mechanism 364 is employed which is similar in all material respects to the clock spring mechanism 342 used for returning the switch arm 350.

A limit switch assembly indicated generally in Figure 17 of the drawings by the reference character 365 is suitably supported as by means of a bracket 366 carried by the side plate 311. The switch assembly 365 includes two movable contacts 367 and 368 both of which include extension arm portions 369 positioned to be engaged by a cam lobe 370 formed on the periphery of the driving disk 354. The movable contact 367 is flanked by a pair of contacts 371 and 372, the latter normally engaging the movable contacts, and the former being engageable by the movable contact upon movement thereof. Similarly, a stationary contact 373 bears a normally open relation to the movable contact 368.

The switch operators 369 are so positioned relative to the cam portion 370 as to cause movement of the first movable contact 367 upon an initial unit angular rotation of the driving disk 354, and so as to cause movement of the second movable contact 368 upon angular movement of the driving disk 354 through two such angular increments.

The switch formed by the movable contacts 367 and stationary contact 371 comprises the limit switch LSra shown in Figure 4, and the switch formed by the movable contact 367 and the stationary contact 372 comprises the limit switch LSrb shown in that figure. The limit switch LS1 mentioned with reference to Figure 4 comprises the movable contact 368 and stationary contact 373.

In Figures 18 through 20 there is illustrated a recording mechanism which is particularly adapted to the making of a permanent record of all of the data necessary to identify the program paid for by the deposit of coins in the coin collection apparatus. As is shown in Figures 18 through 20 the recording apparatus is mounted upon an angle shaped base structure comprising a back plate 380 from the lower edge of which a horizontal shelf portion 381 extends forwardly. A supply spool 382 for holding a supply of recording medium is removably supported upon a spindle 383 carried by the back plate member 380, the spindle 383 being surrounded by a suitable spacer 384 for holding the spool 382 in a position spaced from the back plate 380 as is shown in Figure 18. The spool 382 is mounted upon the spindle 383 for rotation relative thereto.

Upon the supply spool 382 there is wound a supply of recording medium which is preferably in the form of an enlogated tape as is represented at 385 in Figure 19. One end of the tape 385 is removed from the spool 382 and passed through a recording mechanism indicated generally at 386 and wound upon a takeup spool 387. The takeup spool 387 is rotatably supported upon a spindle 388 and is arranged to be readily removable therefrom. The spindle 388 is secured to the back plate 380. Also rotatably mounted upon the spindle 388 is a ratchet wheel 389 carrying one or more horizontally projecting drive pins 390 which are adapted to be received in suitable apertures formed in the hub portion of the takeup spool 387.

The ratchet wheel 389 is arranged to be rotated in a step-by-step fashion by the alternate energization and de-energization of a tape drive solenoid 391. The solenoid 391 is secured as by means of a bracket 392 to the back plate 380 and includes a plunger 393 which is adapted to be moved to the left as viewed in Figure 19 upon energization of the solenoid 391. The outer end of the plunger 393 is connected by means of a pin and slot construction shown at 394 to an oscillatable crank arm 395 mounted for oscillating movement upon the spindle 388.

To the outer end of the crank arm 395 is pivotally secured a pawl member 396 which is provided with a pawl tooth 397 adapted to engage ratchet teeth 398 formed on the ratchet wheel 389. The pawl 396 is urged into engagement with the ratchet teeth by means of a tension spring 399 which is so arranged as to return the pawl 396 and oscillatable crank 395 to the initial position shown in Figure 19 whenever the solenoid 391 is de-energized.

It will be seen that with the structure described, energization of the solenoid 391 will cause the ratchet wheel 389 to be rotated in a counterclockwise direction as viewed in Figure 19, and that subsequent de-energization of the solenoid 391 will allow the spring 399 to restore the parts to their initial positions. A spring pressed holding pawl 400 pivotally supported upon the back plate 380 and spring urged as by means of a spring 401 into engagement with the ratchet teeth 398 serves to hold the ratchet wheel 389 against rotation in a clockwise direction during the returning movement of the pawl driving mechanism.

It will be seen that the structure thus far described provides means for drawing the tape 385 from the supply reel 382 past the recording mechanism 386 to be wound upon the takeup reel 387, the movement of the tape past the recording mechanism 386 being in a step-by-step fashion resulting from the alternate energization and de-energization of the solenoid 391. The solenoid 391 comprises the tape drive solenoid TDS which was shown and described with reference to Figure 4.

The recording assembly 386 may be of any suitable type adapted to make a suitable permanent record upon the recording medium 385. Preferably the recording medium 385 is of the magnetic tape type and preferably comprises a magnetic recording tape of the paper type which is coated with magnetic oxides suitable for magnetic recording and currently available for use in conventional magnetic sound recording machines.

As is perhaps best shown in Figure 20, the recorder assembly 386 comprises a magnetic anvil 402 over which the tape is drawn as it is moved from the supply reel to the takeup reel. In moving over the anvil 402 the tape 385 passes under two recording pole pieces 403 and 404, one engaging a portion of the tape near one side edge thereof, and the other engaging a portion of the tape adjacent the other side edge thereof so as to record two separate tracks longitudinally of the tape 385. Each of the pole pieces 403 and 404 are connected to or formed integrally with core members 405 and 406 surrounded respectively by energizing coils 407 and 408, upon which the signals desired to be recorded are impressed. The coils 407 and 408 comprise the magnetic recorders R1 and R2 heretofore mentioned with reference to Figure 4.

It will be recalled with reference to the description of Figures 3B and 4 that the F3 pulses are applied to one of the recording heads and the F4 pulses are applied to the other recording head. Thus two tracks are recorded side by side on the recording medium 385, one comprising the F3 pulses, and the other comprising the F4 pulses. It will also be recalled that each F3 pulse and each F4 pulse is followed by an F1 pulse, and that the circuitry is so arranged that during the recording operation the F1 pulses are applied to the tape drive solenoid 391. Thus the tape 385 is moved a unit incremental distance between the recording of each of the pulses applied to the recording heads 407 and 408.

In recording the F3 and F4 pulses in this fashion, the record made comprises a small magnetized area for each pulse, the magnetized areas being spaced from each other by areas of non-magnetized material. The difference between this form of recording and conventional magnetic recording is to be noted. In conventional magnetic recording, the tape 385 is moved continuously at a relatively high rate of speed whereas in the recorder illustrated in Figures 18 through 20, the tape is merely notched forward a small distance between pulses, and is stationary during the times the pulses are applied to the recording heads. Thus, the number of pulses transmitted and received by the receiving apparatus may be determined merely by counting through a suitable pickup device the number of magnetized areas on each of the two tracks of recording provided on the recording medium 385.

The coin sorting mechanism illustrated and described with reference to Figures 8 through 12, the coin counting and integrating mechanism and the coin interlock device described with reference to Figures 13 through 17, and the recording apparatus just described with reference to Figures 18 through 20 are preferably all mounted within the housing 251 mentioned with reference to Figure 8 so as to comprise a compact unitary attachment assembly adapted to be connected to the controlled receiver by a minimum of electrical conductors. The unscrambling apparatus, the unscrambling actuator, and the various relays and devices associated with the pulse distributor and control device 91 heretofore described with reference to Figure 4 are preferably manufactured as a separate unit adapted to be suitably secured in any convenient position within the cabinet of the television receiver to which this attachment is to be connected.

From the foregoing it will be observed that the present invention provides a prepaid entertainment distribution system which is particularly adapted to the distribution of entertainment material through electromagnetic radiation such as is used in the transmission of radio and television programs. Attention is directed particularly to coin control apparatus which makes possible variations in the price of the various programs to correspond to the quality and duration of the programs, and which also functions to maintain a permanent record of all of the data necessary for a proper allocation of the received monies among the various persons, organizations, producers and transmitters of the entertainment material.

It will be noted that the apparatus has been so constructed and arranged as to make the adaptation to existing receiver installations as simple as possible and so as to require a minimum of change or alteration of the receiving apparatus, thus adapting the system particularly to use with existing radio and television broadcasting systems, and allowing the apparatus to be readily attached and operatively connected with existing radio and television receivers in homes and like locations. Attention is again directed to the fact that such adaptation of existing receiver installations does not in any way interfere with the normal use of receivers and permits the reception at any time of any free programs which may be available.

It will be understood that the housing 251 which encloses the coin box 252 is provided with a suitable access to permit authorized representatives of the program distributing organization to periodically collect the coins that are deposited therein. Preferably the entire coin box is removable from the housing and also preferably the recording apparatus which is illustrated in Figures 18 through 20 is permanently attached to the coin box and the electrical connections thereto are made by plug and socket means. In this way, the authorizzed representative who collects the coins merely removes the coin box and attached recorder and replaces the same with an empty coin box and loaded recorder ready for immediate operation. The act of replacing the coin box re-establishes the electrical connections to the recorder by reason of the plug and socket arrangement just mentioned.

At a suitable central location or accounting office, the used portion of the record tape is taken from the recorder and joined to similar sections of tape taken from other recorders to form one or more long continuous tapes. These tapes may be fed through well known types of electrical posting and tabulating machines to determine the proper distribution of the collected coins among the various suppliers of the entertainment distributed during the period of time covered by the record tape, it being understood that the recorded data comprising a code number for each program received so completely identifies the program paid for as to permit a proper allocation of the received coins.

It will be appreciated that free programs may be transmitted at any time from any of the transmitters, merely by taking out of operation the secrecy preserving and controlling apparatus. This permits not only the presentation of free programs, but allows the distribution of non-secret announcements, trailers, and advertisements deigned to persuade users to make greater use of the facilities offered.

While a preferred embodiment of this invention has been shown and described, the same is not to be limited to the details illustrated and specifically mentioned herein, except as defined in the appended claims.

We claim:

1. In a prepaid entertainment distribution system including means at a transmitting station for transmitting a coin demand and for transmitting to a receiving station a series of code signals identifying a concurrently transmitted program, means at the receiving station for establishing a coin demand, means at the receiving station for acknowledging or satisfying said coin demand, a recording apparatus comprising a recording medium, recording means effective after an acknowledgment is made of said coin demand for altering said recording medium upon the reception of each of said code signals, and means for advancing said recording medium past said recording means small unit distances between each code signal of said series.

2. In a prepaid entertainment distribution system including means at a transmitting station for transmitting a coin demand and for transmitting to a receiving station a series of code signals identifying a concurrently transmitted program, means at the receiving station for establishing a coin demand, means at the receiving station for acknowledging or satisfying said coin demand, a recording apparatus comprising a magnetic recording medium, a magnetic recorder operable when energized to magnetize an elemental area of said medium, means effective after an acknowledgment is made of said coin demand for energizing said recorder momentarily for each code signal received, and means for advancing said recording medium past said recorder small unit distances between each code signal of said series.

3. In a prepaid entertainment distribution system including means at a transmitting station for transmitting a coin demand and for transmitting to a receiving station a series of code signals identifying a concurrently transmitted program, and comprising a plurality of separate groups of first signals representing successive identifying characters and second signals interposed between said groups to distinguish one group from another, means at the receiving station for establishing a coin demand, means at the receiving station for acknowledging or satisfying said coin demand, a recording apparatus comprising a recording medium, a pair of recording devices each operable to alter a portion of said recording medium, means effective after an acknowledgment is made of said coin demand for operating one of said recording devices upon reception of said first signals, means for operating the other of said recording devices upon the reception of said second signals, and means for advancing said recording medium past said recording means small unit distances between each code signal of said series.

4. In a prepaid entertainment distribution system including means at a transmitting station for transmitting a coin demand and for transmitting to a receiving station a series of code signals identifying a concurrently transmitted program, and comprising a plurality of separate groups of first signals representing successive identifying characters and second signals interposed between said groups to distinguish one group from another, means at the receiving station for establishing a coin demand, means at the receiving station for acknowledging or satisfying said coin demand, a recording apparatus comprising a magnetic recording medium, pair of magnetic recorders each operable when energized to magnetize an elemental area of said recording medium, means for energizing one of said magnetic recorders momentarily for each of said first signals received, means effective after an acknowledgment is made of said coin demand for energizing the other of said magnetic recorders momentarily for each of said second signals received, and means for advancing said recording medium past said recorder small unit distances between each code signal of said series, said recorders being so positioned relative to said recording medium as to produce two separate tracks thereon as a result of said movement.

5. In a prepaid entertainment distribution system including means at a transmitting station for transmitting a coin demand and for transmitting to a receiving station a series of code signals identifying a concurrently transmitted program, and comprising a plurality of separate groups of first signals representing successive identifying characters and second signals interposed between said groups to distinguish one group from another, and including means for transmitting to said receiving station a control signal immediately following each code signal, means at the receiving station for establishing a coin demand, means at the rceiving station for acknowledging or satisfying said coin demand, a recording apparatus comprising a recording medium, a pair of recording devices each operable to alter a portion of said recording medium, means effective after an acknowledgment is made of said coin demand for operating one of said recording devices upon reception of said first signals, means for operating the other of said recording devices upon the reception of said second signals, and means responsive to the reception of each control signal for advancing said recording medium past said recording means small unit distances.

6. In a prepaid entertainment distribution system including means at a transmitting station for transmitting a coin demand and for transmitting to a receiving station a series of code signals identifying a concurrently transmitted program, and comprising a plurality of separate groups of successive identifying characters, and second signals interposed between said groups to distinguish one group from another and including means for transmitting to said receiving station a control signal immediately following each code signal, means at the receiving station for establishing a coin demand, means at the receiving station for acknowledging or satisfying said coin demand, a recording apparatus comprising a magnetic recording medium, a pair of magnetic recorders each operable when energized to magnetize an elemental area, means effective after an acknowledgment is made of said coin demand for energizing one of said magnetic recorders momentarily for each of said first signals received, means for energizing the other of said magnetic recorders momentarily for each of said second signals received, means for receiving said control signals and means for advancing said recording medium past said recorder small unit distances in accordance with said control signals, said recorders being so positioned relative to said recording medium as to produce two separate tracks thereon as a result of said advancing movement.

7. In a coin operated control means, the combination of: a coin receiver; means defining a single coin channel for receiving coins of different diameters and conveying said coins to said receiver; a plurality of electric switches; a plurality of switch operators extending into said channel for engagement by said coins to momentarily close said switches, said operators being so positioned in said channel that the number of switch operations caused by the passage of a coin through said channel is representative of the monetary value of said coin; and an electrically operated counter connected to said switches.

8. In a coin operated control means, the combination of: means defining a coin receiving aperture for receiving coins of different diameters and denominations up to and including fifty-cent coins; a coin receiver; a plurality of coin channels leading to said receiver; a coin sorter interposed between said aperture and said channels for sorting said coins according to diameter and conducting each denomination of coin to an appropriate channel; a first switch means; a plurality of operators for said first switch means extending into said channels to cause one operation of said switch upon passage of a five cent coin and two operations upon the passage of a ten cent coin; a second switch means; a plurality of operators for said second switch means extending into said channels to cause one operation of said second switch means upon passage of a twenty-five cent coin and two operations upon the passage of a fifty cent coin; a counting device for counting and indicating monetary values in five cent increments; a first drive means connected between said counting device and said first switch means for advancing said counting device one increment for each operation of said first switch means; and a second drive means connected between said counting device and said second switch means for advancing said counting device five increments for each operation of said second switch means.

9. In an entertainment distribution system, the combination of a transmitting station for transmitting a coin demand and for transmitting to a receiving station a program of entertainment material; and means at the transmitting station for transmitting to said receiving station concurrenly with said program a first series of pulses representing said coin demand and a series of code signals identifying said program according to a plurality of sequentially arranged characters, said code signals comprising a plurality of groups of identical first signals representing by the number of such signals in each group different ones of said characters means for receiving said pulses and said code signals, means for establishing a coin demand in accordance with said pulses, means for satisfying or acknowledging said coin demand, and means for producing a recording in accordance with said code signals, said recording means comprising a recording medium and means moving said recording medium during reception of said code signals.

10. In an entertainment distribution system, the combination of a transmitting station for transmitting to a receiving station a program of entertainment material; means at the transmitting station for transmitting to said receiving station concurrently with said program a series of code signals identifying said program according to a plurality of sequentially arranged characters, said code signals comprising a plurality of groups of identical first signals representing by the number of such signals in each group different ones of said characters, and comprising a second signal interposed between each of said groups to distinguish one group from another; signal recording means, and means at said transmitting station for transitting to said receving station a control signal immediately following each code signal, means at the receiving station for receiving said control signal, and means at said receiving station for controlling the operation of said signal recording means in accordance with the control signal.

11. In an entertainment distribution system, the combination of: a transmitting station for transmitting to a receiving station a program of entertainment material; means at said transmitting station for repeatedly transmitting to said receiving station concurrently with said program a plurality of identical series of code signals identifying said program according to a plurality of sequentially arranged characters, said code signals comprising a plurality of groups of identical first signals representing by the number of said signals in each group different ones of said characters, and comprising a second signal interposed between each of said groups to distinguish one group from another; means at said transmitting station for transmitting to said receiving station a control signal immediately following each code signal; means at said transmitting station for transmitting to said receiving station between the transmission of each of said series of code signals a plurality of third signals repersenting in number the price to be paid for the reception of said program; means at said receiving station for receiving said program and for simultaneously receiving said control signal, said first signal, said second signal, and said third signal; a normally inoperative program reproducing means connected to said receiving means; indicating means connected to said receiving means and responsive to the reception of said third signals for indicating said price; coin collecting and integrating means for determining and indicating the monetary value of coins deposited in said coin collection means; comparator means for determining the correspondence between the monetary value indicated by said coin integrating means with said price indicated by said indicating means; control means operated by said comparator means in accordance with said determination for rendering said program reproducing means operative; a recording means for separately recording said first and second signals including a recording medium and a drive means for advancing said recording medium in step by step fashion; and a pulse and a signal distributor means comprising means responsive to the reception of any control signal for applying said received third signals to said indicating means, means responsive to the reception of the first control signal following the application of said third signals to said indicating means for rendering said indicating means non-responsive to further received third signals, means coacting with said comparator means and responsive to the first of said third signals following operation of said control means for applying said first and second signals to said recording means and for applying said control signals to said drive means, and means responsive to the first of said third signals following operation of said recording means for rendering said signal distributor thereafter non-responsive to all of said signals.

12. A receiving station control apparatus for use in a prepaid entertainment distribution system wherein a program is transmitted together with a series of coin demand signals for establishing a coin demand, and the receiving station is normally unable to reproduce said program, said control apparatus including a single normally operable element effective to enable said receiving station to simultaneously receive said program and establish said coin demand, said receiving station having translating means normally rendering said program unavailable, means for acknowledging said coin demand means responsive to said last-named means for rendering said translating effective to render said program available.

13. A prepaid entertainment distribution system including means for transmitting to a receiving station a program, a plurality of coin demand signals for establishing a coin demand, said coin demand signals comprising tone signals at a first frequency, and a series of coded signals identifying said program, said coded signals comprising tone signals at a frequency different than said first frequency, said receiving station having a normally operable element effective to tune said station to simultaneously receive said program together with the coin demand and coded signals, said receiving station having means for acknowledging the coin demand represented by said signals, translating means normally rendering said program unavailable until after said coin demand has been acknowledged, after which said translating means becomes effective to render said program available, and a recording apparatus for reproducing a record in accordance with said coded signals.

14. A receiver including means to establish a coin demand representative of the cost of a coded program, means to acknowledge said coin demand, means actuated responsive to said coin acknowledgment to render said coded program intelligible, a magnetic recording device, and means responsive to said coin acknowledgment to energize said magnetic recording device to make a record identifying said program.

15. In a prepaid entertainment distribution system in which a transmitter transmits a coded program, coin demand signals representative of said program cost, and program identification signals, a receiver including means to establish a coin demand responsive to said signals, means to acknowledge said coin demand, means actuated responsive to said coin demand acknowledgment to render said coded program intelligible, a magnetic recording device, and means responsive to said coin demand acknowledgment to actuate said recording device to magnetically record said program identification signals.

16. In a prepaid television system of the character described, a television receiver at a local station, a plurality of remotely located transmitting stations, means in said receiver for tuning said receiver to the frequency of any one of said transmitting stations and for reproducing the video transmitted by said stations, each of said transmitting stations incorporating video scrambling means, coin operated mechanism associated with said receiver, video unscrambling means at the receiver, means automatically operated upon operation of said tuning means for indicating visually the money required to operate said unscrambling means, and means including said coin operated mechanism automatically operated upon depositing the required money in said coin operated mechanism for operating said unscrambling means to allow reception of unscrambled video.

References Cited in the file of this patent

UNITED STATES PATENTS

| | | |
|---|---|---|
| 1,943,130 | MacPherson | Jan. 9, 1934 |
| 2,000,804 | Wehren | Aug. 7, 1935 |
| 2,224,702 | Seidel | Dec. 10, 1940 |
| 2,393,374 | Herrick | Jan. 22, 1946 |
| 2,510,046 | Ellett et al. | Aug. 30, 1950 |
| 2,573,349 | Miller | Oct. 30, 1951 |
| 2,656,407 | Herrick | Oct. 30, 1953 |
| 2,656,410 | Herrick | Oct. 30, 1953 |

UNITED STATES PATENT OFFICE

CERTIFICATE OF CORRECTION

Patent No. 2,769,024                                October 30, 1956

Lorenzo Del Riccio et al.

It is hereby certified that error appears in the printed specification of the above numbered patent requiring correction and that the said Letters Patent should read as corrected below.

Column 30, line 28, after "demand" insert -- , and --; line 30, before "effective" insert -- means --.

Signed and sealed this 26th day of November 1957.

(SEAL)
Attest:
KARL H. AXLINE

Attesting Officer

ROBERT C. WATSON
Commissioner of Patents